(12) United States Patent
Takahashi et al.

(10) Patent No.: US 7,046,606 B2
(45) Date of Patent: May 16, 2006

(54) OPTICAL DISC DRIVE

(75) Inventors: Rie Takahashi, Hirakata (JP); Yoshihiro Kanda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 254 days.

(21) Appl. No.: 10/489,909

(22) PCT Filed: Sep. 24, 2002

(86) PCT No.: PCT/JP02/09795

§ 371 (c)(1), (2), (4) Date: Mar. 18, 2004

(87) PCT Pub. No.: WO03/030157

PCT Pub. Date: Apr. 10, 2003

(65) Prior Publication Data

US 2004/0246846 A1 Dec. 9, 2004

(30) Foreign Application Priority Data

Sep. 27, 2001 (JP) .............................. 2001-296822

(51) Int. Cl.
*G11B 7/00* (2006.01)

(52) U.S. Cl. ................................... 369/53.2; 369/53.22
(58) Field of Classification Search ............... 369/53.2, 369/53.22, 94, 47.52, 47.1, 53.23
See application file for complete search history.

(56) References Cited

U.S. PATENT DOCUMENTS 6,295,260 B1 * 9/2001 Shihara et al. ............. 369/53.2

FOREIGN PATENT DOCUMENTS

| JP | 4-274033 A | 9/1992 |
| JP | 08-077559 A | 3/1996 |
| JP | 11-176071 A | 7/1999 |
| JP | 2001-028159 A | 1/2001 |
| JP | 2001-357533 A | 12/2001 |

* cited by examiner

*Primary Examiner*—Nabil Hindi
(74) *Attorney, Agent, or Firm*—Akin Gump Strauss Hauer & Feld, LLP

(57) ABSTRACT

An optical disc drive according to the present invention may be loaded with an arbitrarily selected one of optical discs of multiple types including a first optical disc with grooves and a second optical disc with no grooves. The optical disc drive includes: an optical system for irradiating the recording side of the loaded optical disc 1 with a laser beam; a light detecting section 7, which receives reflected light from the optical disc 1 to generate a first output signal representing the quantity of at least a part of the light reflected from an inside portion of the optical disc 1 and a second output signal representing the quantity of at least a part of the light reflected from an outside portion of the optical disc 1; a spot location control section 10 for shifting the spot location of the laser beam on the optical disc across recording tracks on the optical disc 1; and a disc type recognizing section 13 for determining, by an upper envelope signal of at least one of the first and second output signals, whether the loaded optical disc 1 has grooves or not.

22 Claims, 15 Drawing Sheets

OPTICAL DISC DRIVE

CROSS-REFERENCE TO RELATED APPLICATION

This application is a Section 371 of International Application No. PCT/JP02/09795, filed Sep. 24, 2002, the disclosure of which is incorporated herein by reference.

TECHNICAL FIELD

The present invention relates to an optical disc drive. More particularly, the present invention relates to an optical disc drive that can determine whether the optical disc loaded is read-only or recordable.

BACKGROUND ART

Various types of optical discs, including DVDs, are now used extensively as media to store digital copyrighted works such as audio video (AV) data and computer data thereon. Optical discs are roughly classifiable into read-only ones and recordable/rewritable ones (which will be referred to herein as "recordable discs" collectively). Recordable discs are manufactured so as to allow users to record some works thereon as far as their copyright is not infringed. Actually, however, it is quite possible that those recordable discs are used to make unauthorized copies of digital copyrighted works and circulate those illegal discs. To avoid such unfavorable situations, an optical disc drive needs to recognize the type of a given optical disc as read-only or recordable and do some appropriate processing for the purpose of copyright protection if the disc loaded is recordable. In order to discourage willful alternation of recordable discs for the purpose of erroneous recognition, the optical disc drive should recognize the type by sensing the difference in physical structure between the read-only and recordable discs.

Hereinafter, the physical structural difference between read-only and recordable discs will be described with reference to the accompanying drawings.

FIG. 1(a) is a perspective view partly in section illustrating a portion of the recording side of a read-only disc to show two adjacent recording tracks 140 on a larger scale.

In the read-only disc shown in FIG. 1(a), pits 141 and spaces 142 are arranged along spiral recording tracks 140 on the mirrored recording side. The pits 141 are embossed portions that are displaced perpendicularly to the mirrored recording side (i.e., concave portions or convex portions). On the other hand, the spaces 142 are mirrored portions of the recording tracks 140 on which no pits 141 are present. Information is stored there by arranging those pits 141 and spaces 142 in a unique pattern.

FIG. 1(b) is a perspective view partly in section illustrating a portion of the recording side of a recordable disc to show two adjacent grooves 143 on a larger scale. These grooves 143 are located on recording tracks.

In the recordable disc shown in FIG. 1(b), recording marks 144 and spaces 145 are arranged along the grooves 143. Either spiral or concentric grooves 143 are provided on the optical disc. Although not shown clearly in FIG. 1(b), a storage layer is provided on the optical disc. As the storage layer, either a phase change storage layer, of which the refractive index changes upon the exposure to a write laser pulse, or an organic dye film with a variable light absorbance is used extensively. The recording marks 144 are portions in which the phase of the storage layer has been changed locally upon the exposure to the laser pulse and are formed so as to be rewritable at any time. A portion with the recording mark 144 and a portion with the space 145 exhibit mutually different reflectances with respect to a read laser beam. Accordingly, by irradiating a groove with the read laser beam and by detecting the intensity of the reflected beam (i.e., the quantity of the reflected light), the arrangement of the recording marks 144 and spaces 145 can be sensed. In this manner, information may be written as needed as the arrangement of recording marks 144 and spaces 145 on the recordable disc.

As described above, the read-only disc and recordable disc have a physical structural difference between their recording sides. Grooves are present only on the recordable discs.

Japanese Laid-Open Publication No. 2001-28159 pays special attention to the grooves that are present only on those recordable discs and discloses a technique of recognizing the type of a given disc as recordable or read-only by determining whether there are grooves or not.

The groove detecting method disclosed in Japanese Laid-Open Publication No. 2001-28159 will be described with reference to FIG. 2. FIG. 2 shows a configuration for an apparatus for detecting grooves for an optical disc drive.

In the configuration shown in FIG. 2, a photodetector (PD) 200, which is divided into four areas A, B, C and D, receives a light beam that has been reflected from an optical disc and performs photoelectric conversion in each of these four areas A, B, C and D. As a result, four electric signals representing the intensities (or quantities) of the light that was incident on these four areas A, B, C and D are output.

The electric signals, output from the four areas A, B, C and D of the photodetector 200, are input to an adder circuit 201. The adder circuit 200 adds all of these electric signals together, thereby outputting an RF signal.

The RF signal is output from the adder circuit 201 to a sample-and-hold (SH) circuit 202. The sample-and-hold circuit 202 samples and holds the output RF signal of the adder circuit 201 to generate a peak hold signal.

The peak hold signal is output from the sample-and-hold circuit 202 to a low pass filter (LPF) 203. The low pass filter 203 removes high frequency components of the peak hold signal that has been supplied from the sample-and-hold circuit 202, thereby generating an upper envelope signal.

FIG. 3(a) shows the waveforms of an RF signal H and an upper envelope signal I to be obtained when a recordable disc is loaded. FIG. 3(b) shows the waveforms of an RF signal H and an upper envelope signal I to be obtained when a read-only disc is loaded. The waveforms of the RF signal H and upper envelope signal I shown in FIGS. 3(a) and 3(b) are obtained when the beam spot of a light beam on an optical disc crosses the recording tracks of the optical disc. The RF signal H is output from the adder circuit 201 shown in FIG. 2. The envelope signal I is output from the low pass filter 203 shown in FIG. 2. And the waveshape of the envelope signal I is the same as the shape of the upper envelope of the RF signal H.

If an optical disc drive is loaded with a recordable disc, a light beam spot, crossing the recording tracks, is diffracted by the grooves, thus changing the quantity of reflected light as shown in FIG. 3(a). Accordingly, the upper envelope of the RF signal H oscillates at a frequency corresponding to the number of grooves crossed by the light beam spot per unit time. Thus, the upper envelope signal I also oscillates at that frequency.

On the other hand, if the optical disc drive is loaded with a read-only disc, the upper envelope of the RF signal H hardly oscillates as shown in FIG. 3(b) even when the light beam spot crosses the recording tracks. This is because there are no grooves on the recording side of the optical disc. Accordingly, the envelope signal I hardly oscillates, either.

Thus, the optical disc drive disclosed in Japanese Laid-Open Publication No. 2001-28159 pays special attention to such a difference in waveform between the upper envelope signals I obtained from a recordable disc and a read-only disc due to the presence or absence of the grooves and recognizes the type of given disc by sensing this difference.

In the prior art, the photodetector recognizes the type of a given disc based on the total quantity of light received. However, depending on the shape of the light beam spot on the optical disc or the light quantity distribution on the grooves, the variation of the envelope signal may be too small to sense. In that case, it is difficult to determine whether the given optical disc has grooves or not. The shape of the light beam spot and the light quantity distribution may differ with the specific arrangement of an optical system for an optical head or the specific design of the optical disc and may also be affected by the tilt of the light beam and the shift of the focal point. Thus, according to the conventional technique, it is not possible to determine reliably enough whether the grooves are present or absent.

In order to overcome the problems described above, an object of the present invention is to provide an optical disc drive that can appropriately sense the difference in surface shape between multiple types of optical discs and thereby recognize the type of the given optical disc accurately without being affected by the difference in light beam spot shape or light quantity distribution.

DISCLOSURE OF INVENTION

An optical disc drive according to the present invention may be loaded with an arbitrarily selected one of optical discs of multiple types including a first optical disc with grooves and a second optical disc with no grooves. The optical disc drive includes: an optical system for irradiating the recording side of the loaded optical disc with a laser beam; a light detecting section, which receives reflected light from the optical disc to generate a first output signal representing the quantity of at least a part of the light reflected from an inside portion of the optical disc and a second output signal representing the quantity of at least a part of the light reflected from an outside portion of the optical disc; a spot location control section for shifting the spot location of the laser beam on the optical disc across recording tracks on the optical disc; and a disc type recognizing section for determining, by an upper envelope signal of at least one of the first and second output signals, whether the loaded optical disc has grooves or not.

In one preferred embodiment, the first optical disc is a recordable optical disc including a storage layer and the second optical disc is a read-only optical disc including a plurality of pits that are arranged along the recording tracks.

In another preferred embodiment, the light detecting section receives the light that has been reflected from the optical disc, divides the reflected light into multiple parts such that the laser beam spot on the optical disc is divided into at least two in a tangential direction of the recording tracks, and outputs the signals representing the light quantities of the respective divided parts.

In another preferred embodiment, the disc type recognizing section includes: a peak envelope detector circuit, which receives the first or second output signal and carries out peak envelope detection on high-intensity components of the received signal, thereby detecting the maximum quantity of light received and generating the upper envelope signal; and an amplitude detecting section for detecting an alternating current amplitude of the upper envelope signal.

In another preferred embodiment, the disc type recognizing section includes: a peak envelope detector circuit, which receives the first and second output signals and carries out peak envelope detection on high-intensity components of each of the output signals received, thereby detecting the maximum quantity of light received and generating the upper envelope signals of the first and second output signals; a difference calculating section for calculating a difference between the upper envelope signals of the first and second output signals; and an amplitude detecting section for detecting an alternating current amplitude of the output signal of the difference calculating section.

In another preferred embodiment, the optical disc drive further includes an amplitude normalizing section for normalizing the output signal of the amplitude detecting section with a selected one of the extreme values of the output signal of the peak envelope detector circuit. The extreme value selected is associated with the higher quantity of light reflected.

In another preferred embodiment, the peak envelope detector circuit receives the first output signal, representing the total quantity of the light reflected from the inside portion of the optical disc, and/or the second output signal, representing the total quantity of the light reflected from the outside portion of the optical disc, and carries out peak envelope detection on one of the first and second output signals that is associated with the higher quantity of light reflected.

In another preferred embodiment, the optical disc drive further includes a tracking error detecting section for outputting a tracking error signal, representing how much the spot location of the laser beam is shifted from the center of the recording tracks, in accordance with the output signal of the light detecting section. The amplitude detecting section includes a synchronous detector section for detecting the amplitude of components of the output signal of the peak envelope detector circuit, which are synchronous with the output signal of the tracking error detecting section, and provides the output of the synchronous detector section as the alternating current amplitude.

In another preferred embodiment, the amplitude detecting section includes: a maximum and minimum value detecting section for detecting the maximum and minimum values of the output signal of the peak envelope detector circuit during a first predetermined period of time; and a maximum–minimum value difference calculating section for calculating a difference between the maximum and minimum values that have been detected by the maximum and minimum value detecting section. The amplitude detecting section provides the output of the maximum–minimum value difference calculating section as the alternating current amplitude.

In another preferred embodiment, the maximum and minimum value detecting section includes: a slot-by-slot maximum and minimum value detecting section for detecting the maximum and minimum values of the output signal of the peak envelope detector circuit in each second period of time that is defined by dividing the first predetermined period of time into multiple time slots; and an average calculating section for calculating an average of multiple maximum values and an average of multiple minimum values that have been detected by the slot-by-slot maximum and minimum value detecting section. The average of the maximum values and the average of the minimum values output from the average calculating section are used as the maximum value and the minimum value of the output signal of the peak envelope detector circuit during the first predetermined period of time.

In another preferred embodiment, the average calculating section calculates the average of the maximum values with either the largest and smallest ones, or second largest and second smallest ones, removed from the maximum values detected by the slot-by-slot maximum and minimum value detecting section, and calculates the average of the minimum values with either the largest and smallest ones, or second largest and second smallest ones, removed from the minimum values detected by the slot-by-slot maximum and minimum value detecting section.

In another preferred embodiment, the optical disc drive further includes a crossing time detecting section for detecting, based on the output signal of the light detecting section, a point in time when the beam spot of the laser beam on the optical disc has crossed the recording tracks a predetermined number of times since a certain point in time. The maximum and minimum value detecting section regards the first and second predetermined periods of time as being output by the crossing time detecting section.

In another preferred embodiment, the peak envelope detector circuit includes a circuit component for rounding the waveform of at least one of the first and second output signals that have been supplied from the light detecting section.

In another preferred embodiment, the spot location control section fixes the beam spot of the laser beam on the optical disc at a certain radial location on the optical disc and offsets the spot location of the laser beam from the center of the recording tracks by utilizing eccentricity of the optical disc rotating.

In another preferred embodiment, the spot location control section shifts the beam spot of the laser beam on the optical disc in a radial direction of the optical disc, thereby offsetting the spot location of the laser beam from the center of the recording tracks.

In another preferred embodiment, the optical disc drive further includes a reading control section for either permitting or prohibiting reading the optical disc in accordance with the output of the disc type recognizing section. If the disc type recognizing section has recognized the loaded optical disc as a read-only optical disc, the reading control section permits reading the optical disc. But if the disc type recognizing section has recognized the loaded optical disc as a recordable optical disc, the reading control section prohibits reading the optical disc.

In another preferred embodiment, the optical disc drive further includes a writing situation sensing section for determining, if the disc type recognizing section has recognized the loaded optical disc as a recordable optical disc, whether information stored on the recordable optical disc was written there legally or illegally.

In another preferred embodiment, the optical disc drive further includes a reading control section for either permitting or prohibiting reading the optical disc in accordance with the output of the disc type recognizing section and the output of the writing situation sensing section. If the disc type recognizing section has recognized the loaded optical disc as a read-only optical disc or if the disc type recognizing section has recognized the loaded optical disc as a recordable optical disc and the writing situation sensing section has discovered that the information was written on the recordable disc legally, the reading control section permits reading the optical disc. But if the disc type recognizing section has recognized the loaded optical disc as a recordable optical disc and the writing situation sensing section has discovered that the information was written on the recordable disc illegally, the reading control section prohibits reading the optical disc.

Another optical disc drive according to the present invention is loadable with an arbitrarily selected one of optical discs of multiple types having recording sides in mutually different surface shapes. The optical disc drive includes: an optical system for irradiating the recording side of the loaded optical disc with a laser beam; a light detecting section, which receives reflected light from the optical disc to generate a first output signal representing the quantity of at least a part of the light reflected from an inside portion of the optical disc and a second output signal representing the quantity of at least a part of the light reflected from an outside portion of the optical disc; a spot location control section for shifting the spot location of the laser beam on the optical disc; and a disc type recognizing section for recognizing the type of the loaded optical disc by an upper envelope signal of at least one of the first and second output signals.

A method for driving an optical disc drive according to the present invention is applied to an optical disc drive loadable with an arbitrarily selected one of optical discs of multiple types including a recordable disc with grooves and a read-only disc with no grooves. The method includes the steps of: irradiating the recording side of the loaded optical disc with a laser beam; receiving light reflected from the optical disc to generate a first output signal representing the quantity of at least a part of the light reflected from an inside portion of the optical disc and a second output signal representing the quantity of at least a part of the light reflected from an outside portion of the optical disc; shifting the spot location of the laser beam on the optical disc across recording tracks on the optical disc; and determining, by an upper envelope signal of at least one of the first and second output signals, whether the loaded optical disc has grooves or not.

In one preferred embodiment, the method further includes the steps of: permitting reading the loaded optical disc if the loaded optical disc has turned out to be the read-only disc; and prohibiting reading the loaded optical disc if the loaded optical disc has turned out to be the recordable disc.

In another preferred embodiment, if the loaded optical disc has turned out to be the recordable optical disc, the method further includes the step of determining whether information stored on the recordable optical disc was written there legally or illegally and rejecting the optical disc if the information was written there illegally.

BEST MODE FOR CARRYING OUT THE INVENTION

Figure 4:
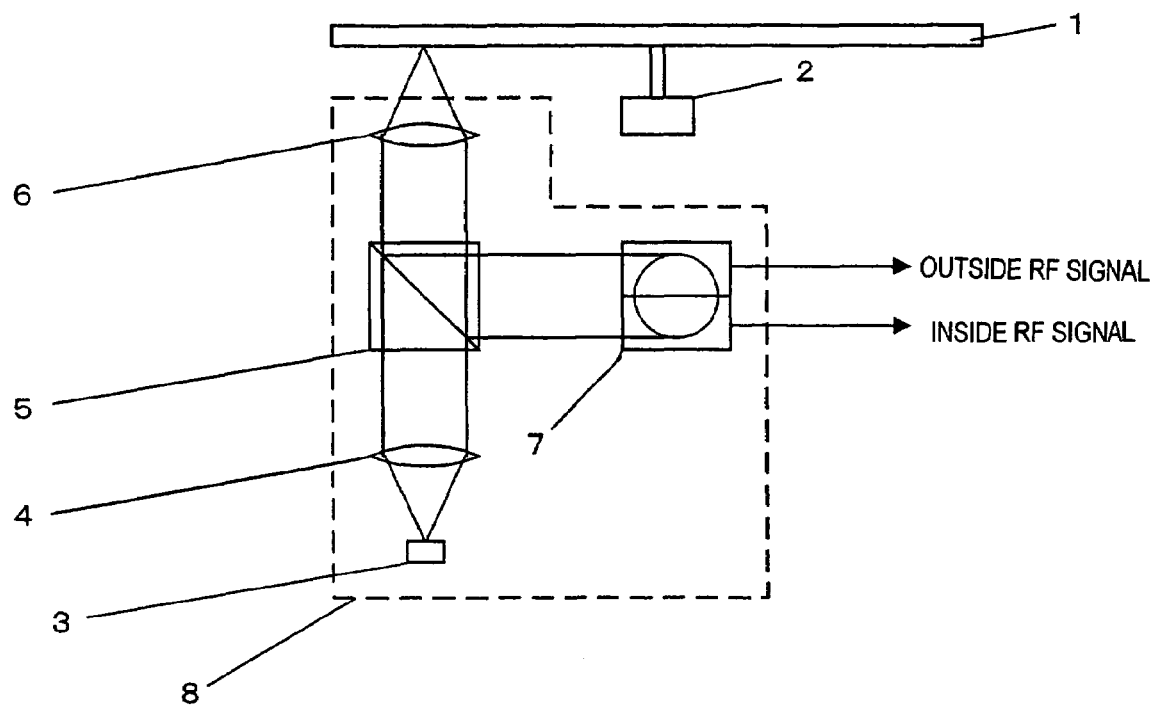
FIG. 4 shows a configuration for an optical head for use in an optical disc drive according to the present invention.

FIG. 4 shows a configuration for an optical head for use in an optical disc drive according to the present invention. The optical head 8 shown in FIG. 4 is a unit, which is provided with an optical system including a semiconductor laser diode 3, a collimator lens 4, a beam splitter 5, an objective lens 6 and a photodetector 7.

FIG. 4 schematically shows a cross section of the optical disc drive loaded with an optical disc 1. The optical disc 1 loaded is rotated by a motor 2.

In the optical head 8, the semiconductor laser diode 3 emits a light beam to irradiate the optical disc 1 with. The collimator lens 4 transforms the light beam, emitted from the semiconductor laser diode 3, into a parallel beam. The beam splitter 5 not only passes the parallel beam, transmitted through the collimator lens 4, toward the objective lens 6 but also separates a portion of the parallel light (that has been reflected from the optical disc 1 and) transmitted through the objective lens 6 toward the direction of the photodetector 7. The objective lens 6 condenses the parallel beam, transmitted through the collimator lens 4 and then the beam splitter 5, thereby forming a light beam spot on the recording side of the optical disc 1. Also, the objective lens 6 transforms the light that has been reflected from the optical disc 1 into parallel light and passes it to the beam splitter 5.

Figure 1:
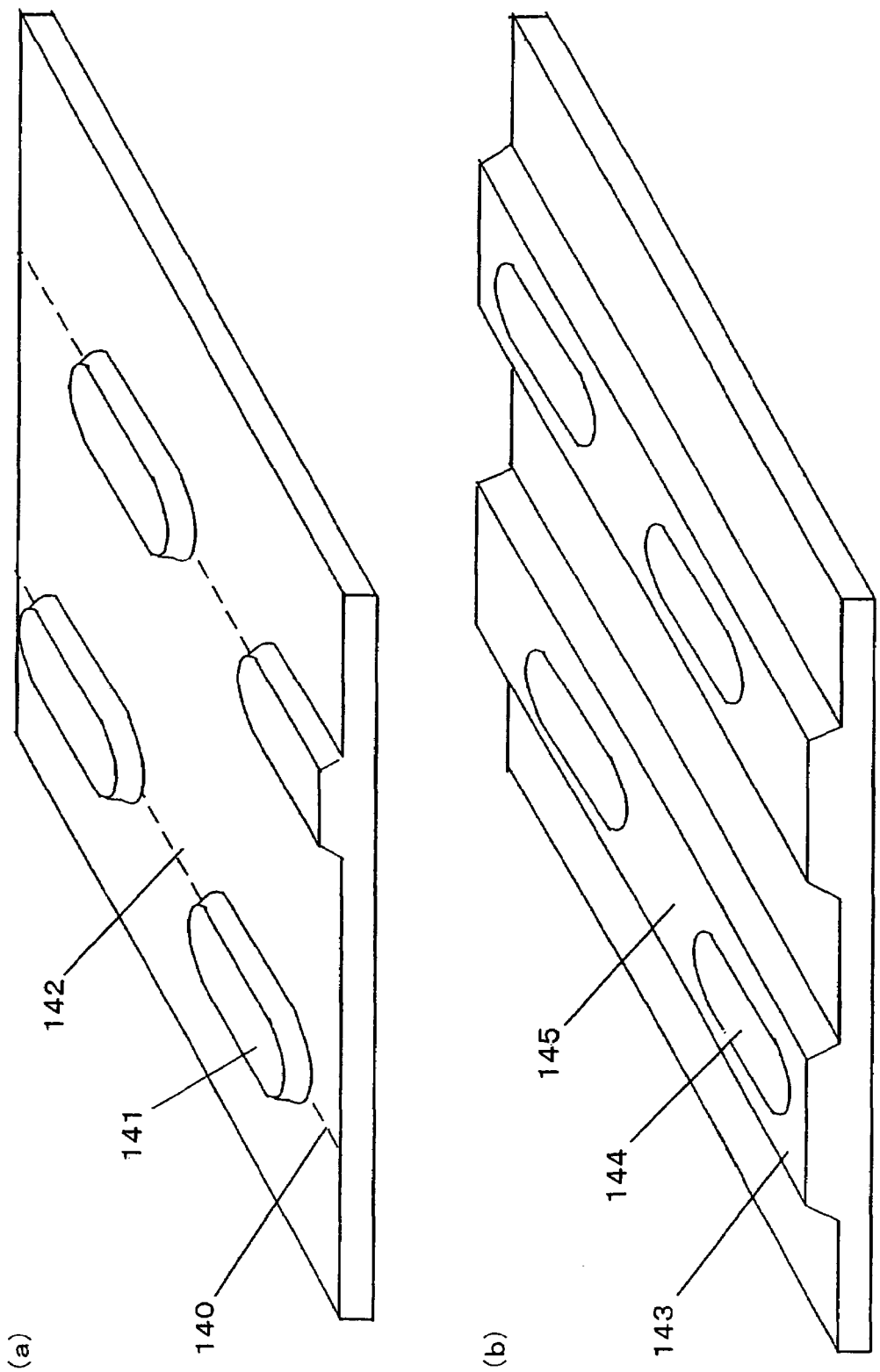
FIG. 1(a) is a perspective view partly in section illustrating a portion of the recording side of a read-only disc.
FIG. 1(b) is a perspective view partly in section illustrating a portion of the recording side of a recordable disc.
Figure 2:
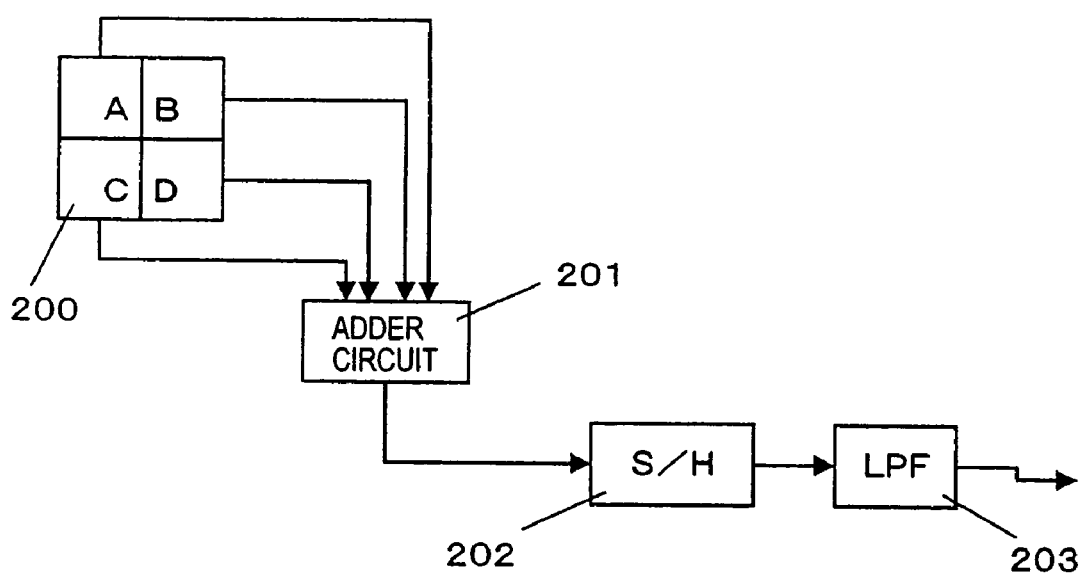
FIG. 2 shows a configuration for an apparatus for detecting grooves in an optical disc drive.

On receiving the parallel light from the beam splitter 5, the photodetector 7 outputs an electric signal, which is proportional to the intensity (or the quantity) of the light received. This electric signal includes radio frequency (RF) components representing the information that is stored along the recording tracks, and will be referred to herein as an "RF signal". As in the known photodetector that has already been described with reference to FIG. 2, the photodetector 7 is also divided into multiple detecting areas, and can separately detect the intensities of the light that has been incident onto those different detecting areas.

When the recording side of the optical disc is irradiated with the light beam, the light beam is reflected by the optical disc. And the intensity distribution of the reflected light beam (i.e., a distribution on a plane that is defined perpendicularly to the optical axis) changes with the location of the light beam on the optical disc (i.e., the location of the light beam spot). The photodetector 7 is designed so as to separately detect the intensities of such a reflected light beam in two divided areas (i.e., inside and outside areas), which are defined in a tangential direction of the recording tracks.

An inside RF signal and an outside RF signal are output from the photodetector 7 having such a configuration. If the overall range on the optical disc 1, in which the light beam spot can be formed, is divided into two portions in the tangential direction of the recording tracks, the inside RF signal is proportional to the quantity of light that has been reflected from the inside portion of the disc, while the outside RF signal is proportional to the quantity of light that has been reflected from the outside portion of the disc.

Figure 3:
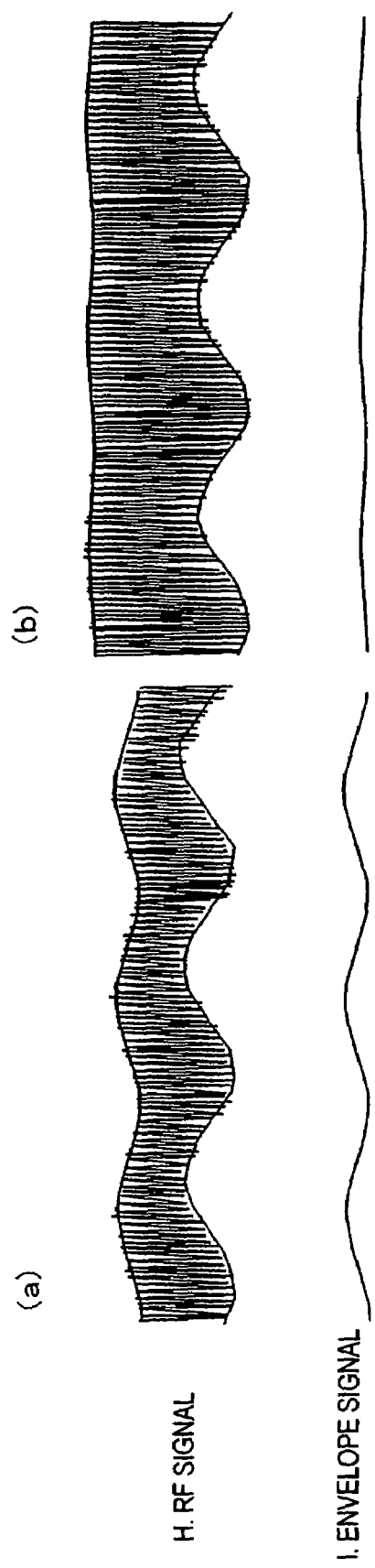
FIG. 3(a) shows the waveforms of an RF signal H and an envelope signal I to be obtained when a recordable disc is loaded.
FIG. 3(b) shows the waveforms of an RF signal H and an envelope signal I to be obtained when a read-only disc is loaded.

In the prior art described above, the presence or absence of grooves on/from an optical disc is sensed based on the sum of the output RF signals of a photodetector. On the other hand, according to the present invention, the output of the photodetector 7 is split into the inside RF signal and outside RF signal, and the presence or absence of grooves on/from the optical disc 1 is detected by the inside RF signal only, the outside RF signal only or the difference between these two RF signals. The envelope signal shown in FIG. 3 is an upper envelope signal representing the sum of the output RF signals of the photodetector. However, the amplitude of this signal may be very small depending on the situation and is inconstant. In contrast, the upper envelope signals of the inside and outside RF signals for use in the optical disc drive of the present invention have sufficiently large amplitudes and are constant enough as will be described in detail later.

Before it is described exactly how the optical disc drive of the present invention detects the presence or absence of the grooves on/from the optical disc 1, the waveforms of the outside and inside RF signals will be described in detail with reference to FIGS. 5 and 6.

Figure 5:
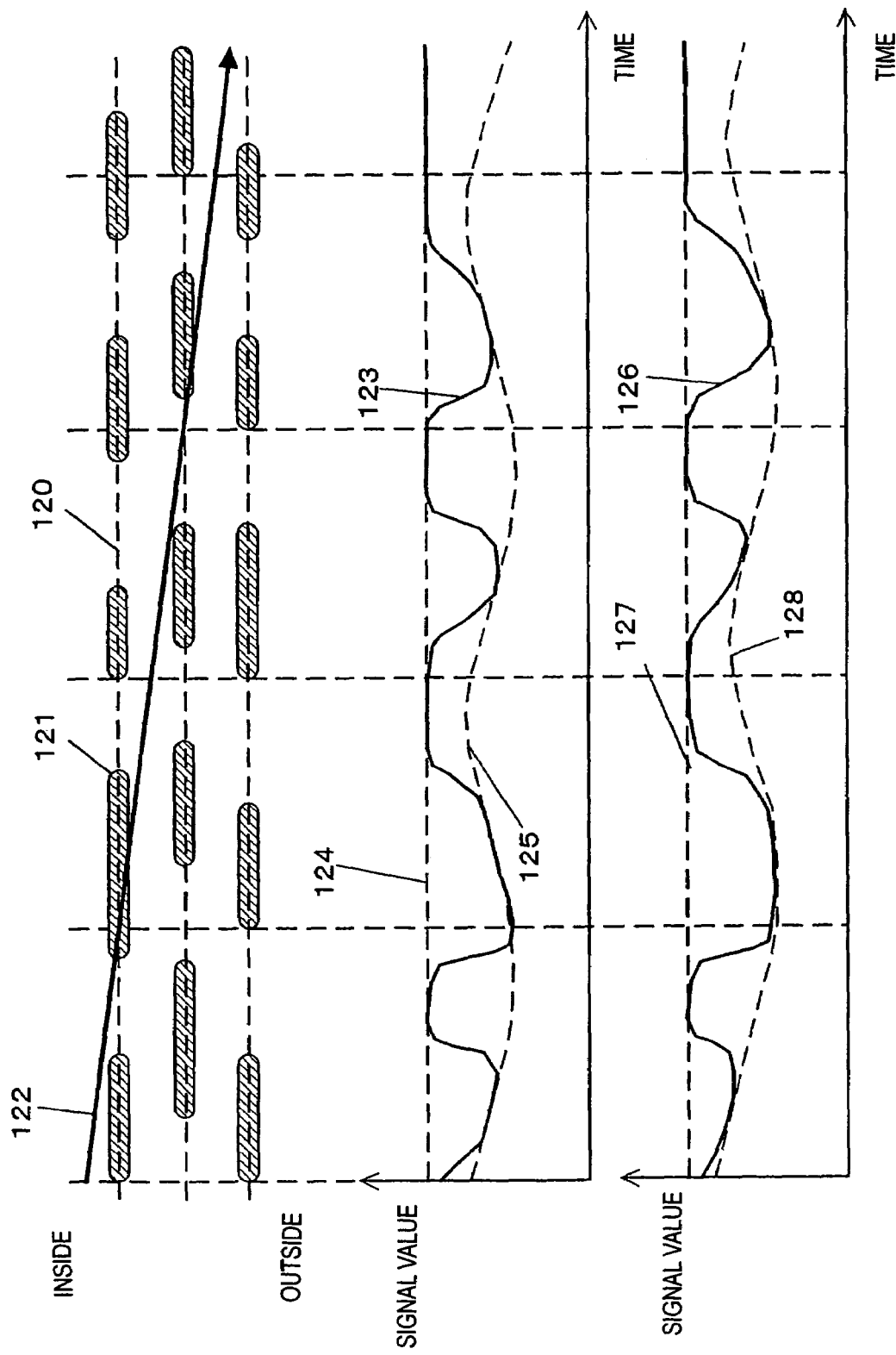
FIG. 5 shows how a light beam spot scans recording tracks on a read-only disc and the waveforms of outside and inside RF signals to be obtained by that scanning.

FIG. 5 shows how a light beam spot scans recording tracks on a read-only disc and the waveforms of the outside and inside RF signals to be obtained by that scanning. It should be noted that the upside of these waveforms corresponds to higher quantities of light reflected.

Three adjacent recording tracks 120 are illustrated on a larger scale in FIG. 5. Pits 121 are provided on the recording tracks 120. Also, the trace 122 of the light beam spot is further illustrated so as to cross the three recording tracks from the inside portion of the optical disc toward the outside portion thereof.

FIG. 5 further shows the waveforms of the outside RF signal 123 and the inside RF signal 126 to be obtained when the light beam spot shifts along the trace 122.

There are the pits 121 and a specular surface on the recording side of the read-only disc. If the light beam spot is located on the specular surface, then the light is not diffracted and the quantity of light reflected is the maximum. On the other hand, if the light beam spot is located on or around any of the pits 121, then the light is diffracted and the quantity of light reflected decreases depending on the positional relationship between the light beam spot and the pit. Accordingly, unless the light beam spot is located near any of the pits 121, a constant quantity of reflected light is obtained irrespective of the relative location of the light beam spot to the recording track 120. As a result, the upper envelope 124 of the outside RF signal 123 and the upper envelope 127 of the inside RF signal 126 are signals with a substantially constant level.

On the other hand, if the light beam spot is located on or around any of those pits 121, then the outside and inside RF signals 123 and 126 have decreased magnitudes. Consequently, the lower envelope 125 of the outside RF signal 123 and the lower envelope 128 of the inside RF signal 126 vary as the light beam spot scans the recording tracks 120.

Figure 6:
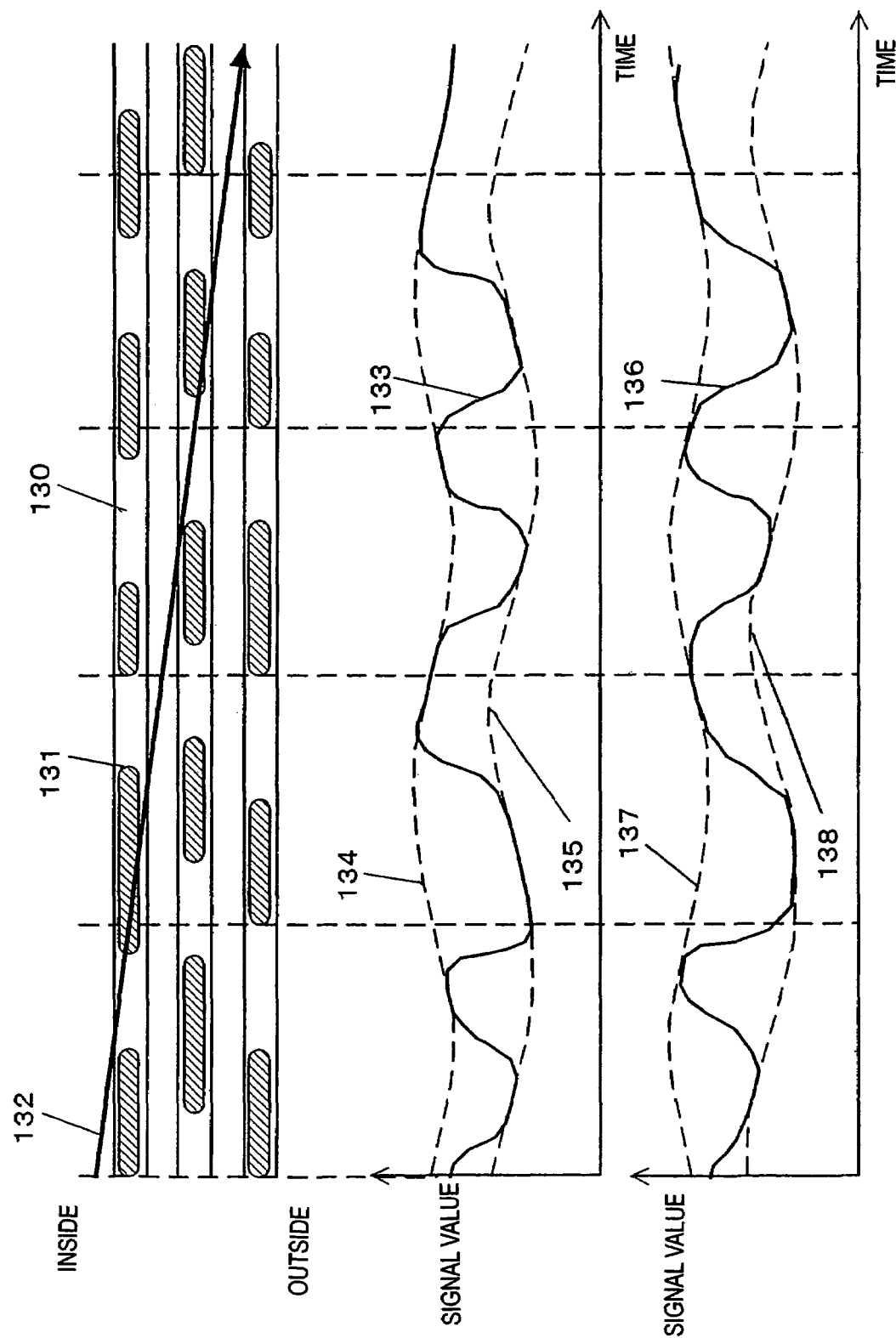
FIG. 6 shows how a light beam spot scans recording tracks on a recordable disc and the waveforms of outside and inside RF signals to be obtained by that scanning.

FIG. 6 shows how a light beam spot scans recording tracks on a recordable disc and the waveforms of the outside and inside RF signals to be obtained by that scanning. It should be noted that the upside of these waveforms corresponds to higher quantities of light reflected.

Three adjacent grooves 130 are illustrated on a larger scale in FIG. 6. Recording marks 131 are formed on the grooves 130. Also, the trace 132 of the light beam spot is further illustrated so as to cross the three grooves 130 from the inside portion of the optical disc toward the outside portion thereof.

FIG. 6 further shows the waveforms of the outside RF signal 133 and the inside RF signal 136 to be obtained when the light beam spot shifts along the trace 132.

Unevenness is created by the grooves 131 on the recording side of the recordable disc and causes diffraction of light. Accordingly, the quantity of reflected light changes proportionally to the magnitude of offset of the light beam spot from the center of the groove. Also, since the recording marks 131 have low reflectance, the quantity of reflected light decreases if the light beam spot is located on or around any of those recording marks 131. As a result, the upper envelopes 134 and 137 vary so as to reflect the variation in the diffraction of light while the light beam spot is crossing the grooves 130.

It should be noted that if the light beam spot is located either at the center of any groove 130 or at a midpoint between two adjacent grooves 130, then the inside diffraction is symmetric to the outside diffraction. Thus, the quantity of light reflected from the inside portion is equal to that of light reflected from the outside portion. On the other hand, if the light beam spot is located at either edge of any groove 130, then the diffraction will not be symmetric. More specifically, if the light beam spot is located at the inside edge of a groove 130, then the quantity of light reflected from the outside portion is smaller than that of light reflected from the inside portion. Meanwhile, if the light beam spot is located at the outside edge of a groove 130, then the quantity of light reflected from the inside portion is smaller than that of light reflected from the outside portion. Consequently, the upper envelope 134 of the outside RF signal 133 and the upper envelope 137 of the inside RF signal 136 substantially have mutually inverted waveforms (i.e., two phases that are shifted from each other by approximately 180 degrees).

It should be noted that while the light beam spot is located on or around any of those recording marks 131, the values of the outside and inside RF signals 133 and 136 decrease. As a result, the lower envelopes 135 and 138 vary so as to reflect the trace of the light beam spot across the grooves 130.

As described above, there is a significant difference in the upper envelope of the outside or inside RF signal due to the presence or absence of grooves between the recordable disc and read-only disc that are currently used extensively. That is to say, as for an optical disc with grooves, the upper envelope of the RF signal varies at the frequency at which the light beam spot crosses the grooves. On the other hand, as for an optical disc without grooves, the upper envelope of the RF signal is invariable and has a substantially constant value.

Thus, an optical disc drive according to the present invention recognizes the type of a given optical disc as recordable or read-only by the difference in signal waveform due to the presence or absence of grooves.

In the preferred embodiment described above, the photodetector 7 is designed so as to separately detect the quantities of light reflected from two divisions that are defined in the tangential direction of the recording tracks for each light beam spot. Thus, the inside RF signal is a signal proportional to the total quantity of light reflected from the overall inside portion including a light beam spot, while the outside RF signal is a signal proportional to the total quantity of light reflected from the overall outside portion including a light beam spot. However, the photodetector 7 does not have to have such a configuration. Alternatively, the photodetector may also be designed so as to separately detect the quantities of light reflected from not only the two divisions defined in the tangential direction of the recording tracks or grooves but also two more divisions defined perpendicularly to the tangential direction for a light beam spot. When such a photodetector with four divisions is adopted, one of two signals, which is proportional to the quantity of light reflected from an inside portion, and one of two signals, which is proportional to the quantity of light reflected from an outside portion, may be used as the inside RF signal and the outside RF signal, respectively. Even so, signals having similar waveforms to those shown in FIGS. 5 and 6 can also be obtained and the recordable and read-only discs can be distinguished from each other by sensing whether the grooves are present or absent. Also, in that case, signals representing the quantities of light reflected from two locations that are symmetric to each other in the tangential direction of the recording tracks are preferably used as the inside and outside RF signals. This is because the upper envelopes of the inside and outside RF signals will substantially have mutually inverted waveforms then.

The photodetector does not have to have this alternative configuration, either, and may be divided into a further greater number of areas.

EMBODIMENT 1

Figure 7:
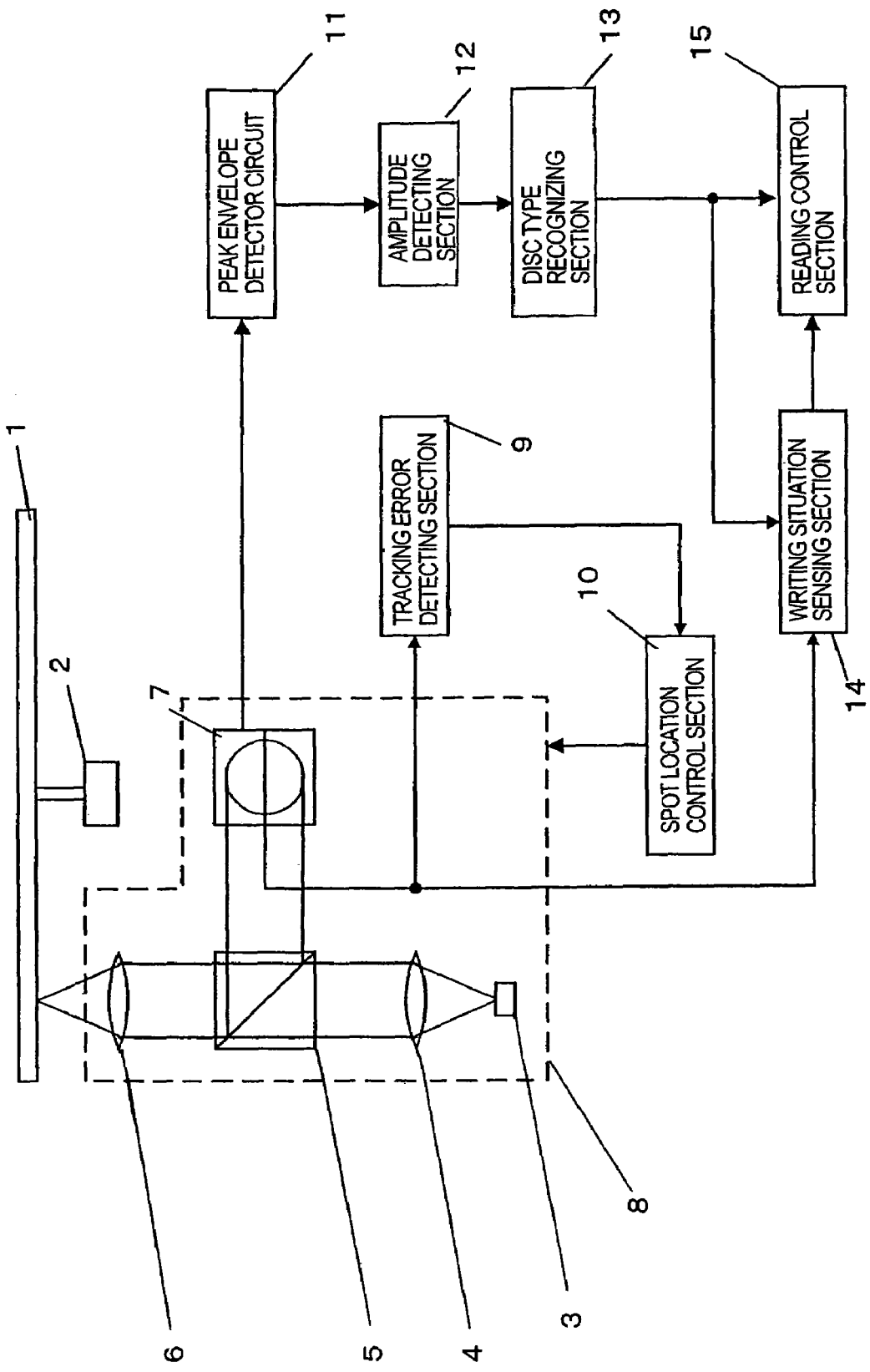
FIG. 7 shows a configuration for an optical disc drive according to a first preferred embodiment of the present invention.

Hereinafter, an optical disc drive according to a first preferred embodiment of the present invention will be described. FIG. 7 shows a configuration for the main section of the optical disc drive of this preferred embodiment.

The optical disc drive shown in FIG. 7 includes not only the optical head 8 shown in FIG. 4 but also the following components: a tracking error detecting section 9, a spot location control section 10, a peak envelope detector circuit 11, an amplitude detecting section 12, a disc type recognizing section 13, a writing situation sensing section 14 and a reading control section 15 to be described below.

The tracking error detecting section 9 receives the output signal of the photodetector 7 of the optical head 8 and detects a tracking error from the output signal of the photodetector 7, thereby generating a tracking error signal.

In accordance with the tracking error signal supplied from the tracking error detecting section 9, the spot location control section 10 generates a control signal and outputs it to the optical head 8. In response to this control signal, the operation of an actuator for driving the optical head 8 is adjusted and the location of the light beam spot on the optical disc 1 is controlled.

The configurations and operations of the tracking error detecting section 9 and spot location control section 10 may be known ones.

The peak envelope detector circuit 11 of this preferred embodiment receives the outside RF signal from the photodetector 7, thereby generating its upper envelope signal.

The amplitude detecting section 12 detects the amplitude of the upper envelope signal supplied from the peak envelope detector circuit 11 (see FIG. 9), thereby generating a signal in which the amplitude is normalized with one of the two extreme values of the upper envelope signal that is associated with the higher quantity of light reflected.

Based on the output signal of the amplitude detecting section 12, the disc type recognizing section 13 determines whether the optical disc 1 loaded in this optical disc drive has grooves or not, i.e., whether the optical disc 1 loaded is a read-only disc or a recordable disc. If the loaded optical disc turns out to be a read-only disc as a result of this decision, then the disc type recognizing section 13 outputs a digital signal representing "0" to the writing situation sensing section 14 and reading control section 15. On the other hand, if the loaded optical disc turns out to be a recordable disc, then the disc type recognizing section 13 outputs a digital signal representing "1" to the writing situation sensing section 14 and reading control section 15.

If the output digital signal of the disc type recognizing section 13 represents "1", then the writing situation sensing section 14 determines, based on the output signal of the photodetector 7, whether the information stored on the optical disc was written there legally or illegally. If the information was written there legally, then the writing situation sensing section 14 outputs a digital signal representing "0" to the reading control section 15. On the other hand, if the information was written there illegally, then the writing situation sensing section 14 outputs a digital signal representing "1" to the reading control section 15. It should be noted that if the output digital signal of the disc type recognizing section 13 represents "0", then the writing situation sensing section 14 just passes a digital signal representing "0" to the reading control section 15 without checking the legality of the information.

The reading control section 15 of this preferred embodiment performs an AND operation on the output digital signals of the disc type recognizing section 13 and writing situation sensing section 14. If the result of the AND operation is "0", then the reading control section 15 outputs a reading control signal, "permitting" reading the optical disc 1 loaded, to the read operation section (not shown) of this apparatus. On the other hand, if the result of the AND operation is "1", then the reading control section 15 outputs a reading control signal, "prohibiting" reading the optical disc 1 loaded, to the read operation section (not shown) of this apparatus.

Next, the details of the amplitude detecting section 12 will be described with reference to FIG. 8, which shows the internal configuration of the amplitude detecting section 12.

Figure 9:
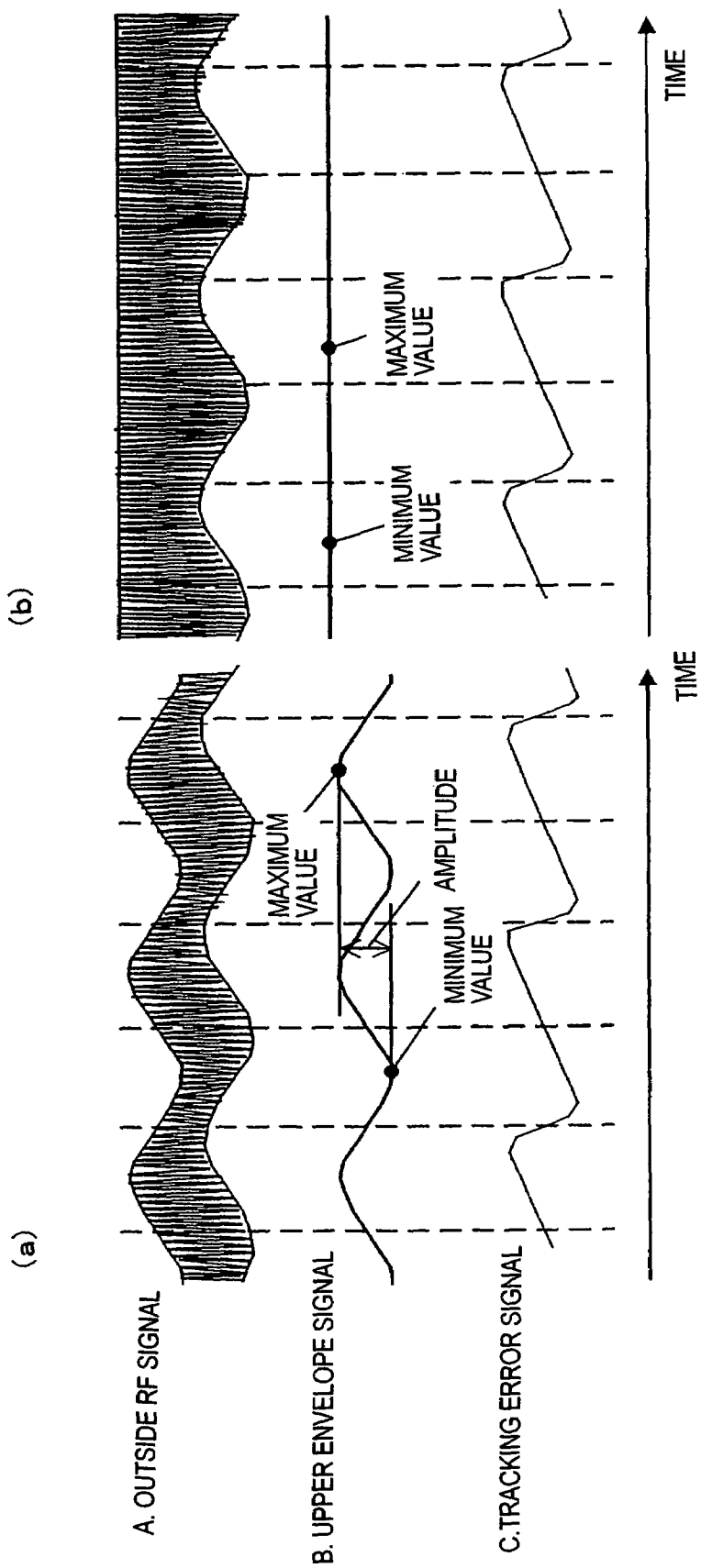
FIG. 9(a) shows exemplary signal waveforms to be obtained when the optical disc drive is loaded with a recordable disc with grooves of the first preferred embodiment of the present invention.
FIG. 9(b) shows exemplary signal waveforms to be obtained when the optical disc drive is loaded with a read-only disc with no grooves of the first preferred embodiment.

The maximum and minimum value detecting section 300 detects the maximum and minimum values of the upper envelope signal supplied from the peak envelope detector circuit 11 during a first predetermined period of time (see FIG. 9). The first predetermined period of time is the time it takes for the light beam spot to cross a recording track or a groove multiple times, and may be set to 0.020 second, for example. The maximum and minimum value detecting section 300 includes a slot-by-slot maximum and minimum value detecting section 301 and an average calculating section 302. The slot-by-slot maximum and minimum value detecting section 301 detects the maximum and minimum values of the upper envelope signal supplied from the peak envelope detector circuit 11 in each second period of time that is defined by dividing the first predetermined period of time into multiple time slots. The second predetermined period of time is the time it takes for the light beam spot to cross a recording track at least once, and may be set to 0.002 second, for example.

The average calculating section 302 calculates the average of multiple maximum values and the average of multiple minimum values that have been detected by the slot-by-slot maximum and minimum value detecting section 301, and outputs them as the maximum value and the minimum value of the upper envelope signal during the first predetermined period of time. The average calculating section 302 calculates the average of the multiple maximum values with the largest and smallest ones of the maximum values removed, and calculates the average of the multiple minimum values with the largest and smallest ones of the minimum values removed.

The maximum–minimum value difference calculating section 303 calculates the difference between the maximum and minimum values that have been detected by the maximum and minimum value detecting section 300 as the absolute value of the amplitude of the upper envelope signal.

The amplitude normalizing section 304 normalizes the absolute value of the amplitude, supplied from the maximum–minimum value difference calculating section 303, with the maximum value supplied from the maximum and minimum value detecting section 300, thereby outputting a normalized amplitude value of the upper envelope signal.

The amplitude detecting section 12 of this preferred embodiment, having such a configuration, can detect the alternating current amplitude of the upper envelope signal output from the peak envelope detector circuit 11.

Next, the configuration of the writing situation sensing section 14 will be described in detail.

If the disc type recognizing section 13 has recognized the loaded optical disc as a recordable disc, the writing situation sensing section 14 determines whether information stored on the recordable disc was written there legally or illegally. Such decision can be made by using auxiliary information that is recorded on recording marks on the optical disc in addition to the contents. Such a detecting method is described in Japanese Laid-Open Publication No. 2001-357533, for example. According to the technique disclosed in Japanese Laid-Open Publication No. 2001-357533, if the auxiliary information is recorded by shifting the phase of the recording marks in the circumferential direction of the optical disc, then the information is regarded as having been written there legally. On the other hand, if the information had been written there illegally, then there would have been no phase shifts and no auxiliary information could have been recorded there.

By detecting the phase shifts of the recording marks based on the output signal of the photodetector 7, the writing situation sensing section 14 determines whether there is the auxiliary information or not. If there is the auxiliary information, then the writing situation sensing section 14 regards the information as having been written there legally. Otherwise, the writing situation sensing section 14 regards the information as having been written there illegally.

Hereinafter, the flow of the disc type recognition will be described.

First, the optical disc 1 loaded is rotated by the motor 2. With a light beam spot formed on the recording side of the rotating optical disc 1, the spot location control section 10 controls the position of the optical head 8 such that the light beam spot crosses the recording tracks on the optical disc 1. In this case, the outside and inside RF signals output from the photodetector 7 have the waveforms shown in FIGS. 5 and 6.

The remaining operations will be described with reference to FIG. 9. FIG. 9 shows exemplary waveforms of the input and output signals of the respective components according to the preferred embodiment shown in FIG. 7. FIG. 9(a) shows exemplary signal waveforms to be obtained when the optical disc drive is loaded with a recordable disc with grooves, and FIG. 9(b) shows exemplary signal waveforms to be obtained when the optical disc drive is loaded with a read-only disc with no grooves.

The outside RF signal A shown in FIGS. 9(a) and 9(b) is the output signal of the photodetector 7. The upper envelope signal B is a signal obtained by getting peak envelope detection done on the outside RF signal A by the peak envelope detector circuit 11. The tracking error signal C is the output signal of the tracking error detecting section 9. The frequency of the tracking error signal C is equal to the frequency at which the light beam spot on the optical disc crosses the recording tracks on the optical disc 1.

If the optical disc drive is loaded with a recordable disc, the upper envelope of the outside RF signal A oscillates at the same frequency as the tracking error signal C as shown in FIG. 9(a). Accordingly, the upper envelope signal B is a signal that oscillates at the same frequency as the tracking error signal C. For that reason, the absolute value of the amplitude, obtained by getting the maximum and minimum values of the upper envelope signal B detected by the maximum and minimum value detecting section 300 within the amplitude detecting section 12 over several periods of the tracking error signal C and by getting their difference calculated by the maximum–minimum value difference calculating section 303, has a value which is at least equal to a certain value. In the same way, the normalized amplitude value, obtained by getting the amplitude normalized with the maximum value of the upper envelope signal B by the amplitude normalizing section 304, also has a value which is at least equal to a certain value.

On the other hand, if the optical disc drive is loaded with a read-only disc, the upper envelope of the outside RF signal A hardly varies as shown in FIG. 9(b). Accordingly, the upper envelope signal B becomes a signal that hardly varies, either. Consequently, the normalized amplitude value of the upper envelope signal B, detected by the amplitude detecting section 12 over several periods of the tracking error signal C, is approximately equal to zero.

In this manner, if the value obtained by the amplitude detecting section 12 is equal to or greater than a predetermined value, then the disc type recognizing section 13 recognizes the loaded disc as a recordable disc. On the other hand, if the value obtained by the amplitude detecting section 12 is less than the predetermined value, then the disc type recognizing section 13 recognizes the loaded disc as a read-only disc.

In the preferred embodiment described above, the type recognition is carried out using the outside RF signal. Alternatively, the type recognition may also be carried out with the inside RF signal.

Optionally, the photodetector 7 may also be designed so as to separately detect the quantities of light reflected from not only the two divisions defined in the tangential direction of the recording tracks or grooves but also two more divisions defined perpendicularly to the tangential direction for a light beam spot. If a photodetector with such a configuration is adopted, one of two signals, which is proportional to the quantity of light reflected from an inside portion, and one of two signals, which is proportional to the quantity of light reflected from an outside portion, may be used as the inside RF signal and the outside RF signal, respectively.

The following is the flow of processes to be carried out after the disc type has been recognized.

If the disc type recognizing section 13 has recognized the loaded optical disc as a recordable disc, then the writing situation sensing section 14 determines whether the information stored on the optical disc was written there legally or illegally, thereby outputting a digital signal representing the decision result. On the other hand, if the disc type recognizing section 13 has recognized the loaded optical disc as a read-only disc, then the writing situation sensing section 14 outputs a digital signal with a value of zero.

The reading control section 15 performs an AND operation on the two output digital signals of the disc type recognizing section 13 and writing situation sensing section 14. In this case, if the loaded optical disc is either a read-only disc or a recordable disc on which information was written legally, then the result of the operation is "0", thus permitting reading the given optical disc. On the other hand, if the loaded optical disc is a recordable disc on which information was written illegally, then the result of the operation is "1", thus prohibiting reading the optical disc.

The read operation section of the optical disc drive according to this preferred embodiment selectively performs its read operation in accordance with such an instruction to permit or prohibit reading the given optical disc.

The upper envelope signal, obtained by using one of the output signals of the photodetector that is divided into two in the tangential direction of the recording tracks on the optical disc, has several times as great amplitude as the envelope signal of the prior art. Accordingly, the type of the given disc can be recognized with high reliability. As a result, a read-only disc and a recordable disc with legally written information are accepted but a recordable disc with illegally written information is rejected, thus strongly discouraging circulation of illegal discs.

The auxiliary information does not have to be recorded by using the phase shift of the recording marks. Also, the legality of the information written does not have to be judged by using such auxiliary information but may also be checked by any other method.

Furthermore, the writing situation sensing section 14 for determining whether or not the information on a recordable disc was written there legally is not an indispensable component for the optical disc drive of the present invention. Alternatively, instead of providing this writing situation sensing section 14, the reading control section 15 may permit or prohibit reading the loaded optical disc based on only the result of type recognition performed by the disc type recognizing section 13. In that case, if the output digital signal of the disc type recognizing section 13 is "0", then the reading control section 15 outputs a reading control signal, permitting reading the loaded optical disc 1, to the read operation section (not shown) of this optical disc drive. On the other hand, if the output digital signal of the disc type recognizing section 13 is "1", then the reading control section 15 outputs a reading control signal, prohibiting reading the loaded optical disc 1, to the read operation section (not shown) of this optical disc drive. Such an optical disc drive accepts only read-only discs and rejects all recordable discs. Accordingly, potentially illegally copied optical discs are eliminated from the beginning, thus strongly discouraging the circulation of illegal discs.

The first and second predetermined periods of time may be calculated with the rate at which the light beam spot crosses the recording tracks expected. Alternatively, those periods of time may be set equal to predetermined numbers of periods of the output tracking error signal of the tracking error detecting section 9 by monitoring the tracking error signal at regular intervals. The former method can be carried out with the software or hardware overhead minimized during the disc type recognition. According to the latter method, even if the rate at which the light beam spot crosses the recording tracks changes due to a variation in the rotational velocity of the optical disc or eccentricity thereof during the amplitude detecting operation, the maximum and minimum values can also be detected constantly every time the light beam spot has crossed the recording tracks a predetermined number of times. As a result, the amplitude can be detected with more reliability.

There are roughly following two methods for the spot location control section 10 to make the light beam spot cross the recording tracks on the optical disc.

A first method is a method for relatively shifting the recording tracks or grooves in the radial direction with respect to a light beam spot, fixed at a radial location on the optical disc, by utilizing the eccentricity of the optical disc rotating. According to this method, there is no need to move the optical head 8 in the radial direction. Thus, this method can be carried out easily with no head move control program run by software, for example, and the power dissipation can also be cut down.

A second method is a method for making the light beam spot cross the recording tracks by moving the optical head 8 in a certain radial direction, i.e., either toward the inside portion of the optical disc 1 or toward the outside portion thereof. According to this method, the light beam spot crosses the recording tracks in a constant direction. Thus, the crossing direction of the light beam spot never reverses due to the eccentricity of the optical disc while the light beam spot is crossing one recording track. As a result, the amplitude of the upper envelope signal does not decrease and can be detected constantly.

The movement of the optical head in the radial direction of the optical disc may be controlled such that the optical head moves for a predetermined amount of time to be calculated in advance based on the width of the recording tracks in the radial direction, the rate at which the light beam spot is shifted, and the number of tracks that the light beam spot is supposed to cross. Alternatively, the optical head may also be moved continuously in the radial direction until the number of periods of the output tracking error signal of the tracking error detecting section 9, which are monitored at regular intervals, reaches a predetermined number. The former method can be carried out with the software or hardware overhead minimized during the disc type recognition. According to the latter method, even if the rate at which the light beam spot crosses the recording tracks or grooves changes due to a variation in the rotational velocity of the optical disc or eccentricity thereof during the amplitude detecting operation, the light beam spot can still cross the recording tracks or grooves a predetermined number of times. As a result, the amplitude can be detected constantly.

In detecting the alternating current amplitude of the upper envelope signal, the amplitude normalizing section 304 normalizes the amplitude with the maximum value of the upper envelope signal, i.e., the maximum quantity of light reflected as represented by the outside or inside RF signal. The maximum quantity of light reflected is substantially determined only by the reflectance that changes with the shape of the light beam spot, the light quantity distribution and the type of the optical disc. Accordingly, if the amplitude is normalized with the maximum quantity of light reflected, then the amplitude of the upper envelope signal is not affected by these factors anymore. As a result, the difference in amplitude due to the presence or absence of grooves can be detected even more clearly.

Figure 8:
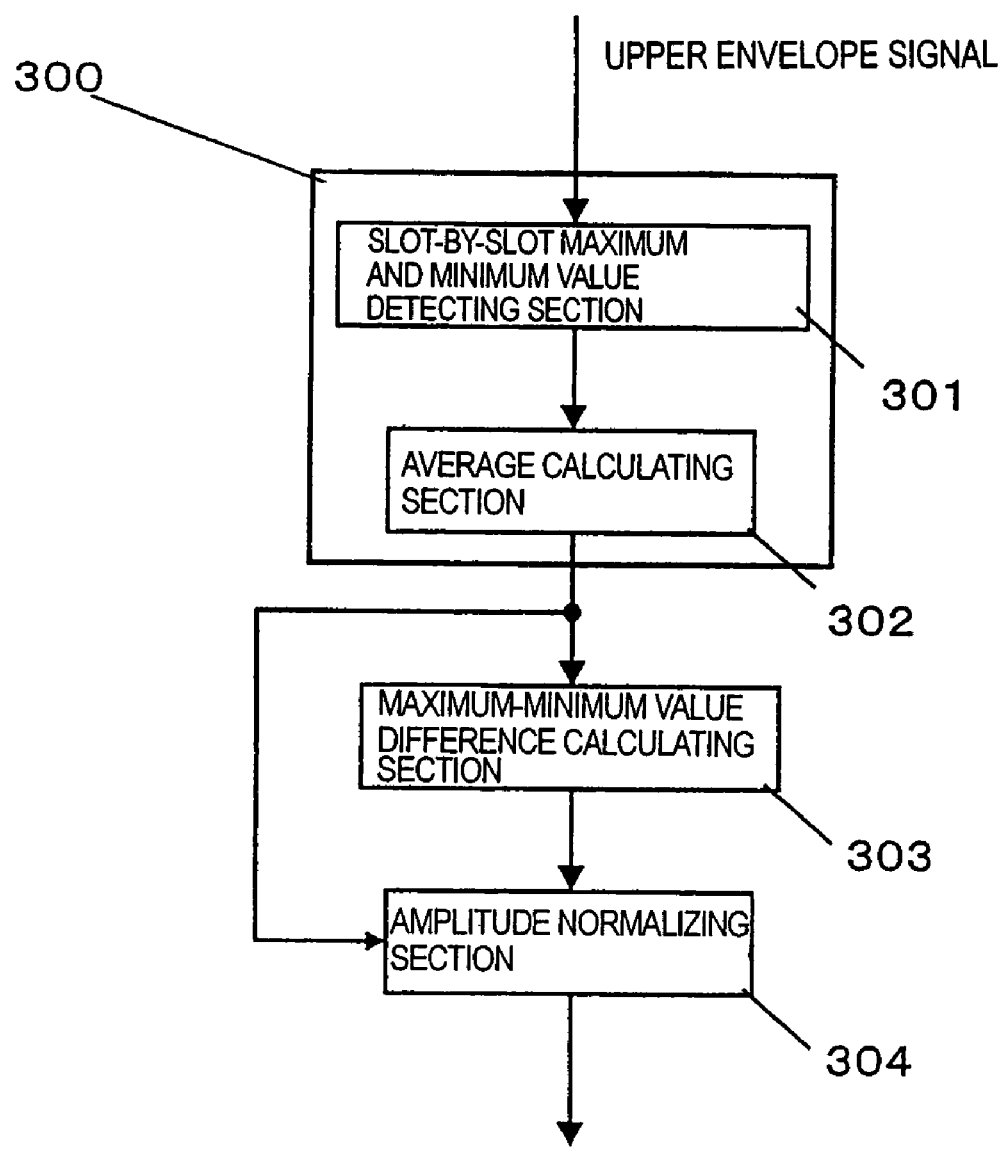
FIG. 8 is a block diagram showing an internal configuration for the amplitude detecting section 12 of the first preferred embodiment of the present invention.

In this preferred embodiment, the maximum and minimum value detecting section 300 detects the maximum and minimum values in a first predetermined period of time as shown in FIG. 8. Specifically, the slot-by-slot maximum and minimum value detecting section 301 divides the first predetermined period of time into multiple time slots and detects the maximum values and minimum values multiple times. Then, the average calculating section 302 calculates the average of the multiple maximum values and that of the multiple minimum values. By adopting such a detecting technique, even if some outstanding variation has been sensed in the upper envelope signal due to not the presence or absence of grooves but noise, defects on the recording side of the optical disc or land pre-pits (LPPs) of a DVD-R or DVD-RW disc, the unwanted effects thereof can be reduced significantly and the erroneous amplitude detection can be prevented.

The average of the multiple maximum values is preferably calculated with the largest and smallest ones removed and the average of the multiple minimum values is preferably calculated with the largest and smallest ones removed, too. Then, the unwanted effects of the noise, defects on the recording side and LPPs can be further reduced.

Optionally, the average of the multiple maximum or minimum values may also be calculated with not only the largest and smallest ones but also second largest and smallest ones removed. In that case, the unwanted effects of the noise, defects on the recording side and LPPs can be further reduced.

In the preferred embodiment described above, to detect the amplitude with more reliability, the averaging process is carried out by the slot-by-slot maximum and minimum value detecting section 301 and average calculating section 302 and the normalizing process is also carried out by the amplitude normalizing section 304. However, the amplitude of the upper envelope signal can also be detected even if these processes are omitted. The maximum and minimum values can also be detected by just comparing sampled values with each other sequentially. Then, the maximum and minimum values can be detected with a simplified circuit configuration or a simplified program. Accordingly, if the averaging and normalizing processes are omitted, the amplitude can be detected in a short time with a simpler configuration adopted.

Figure 10:
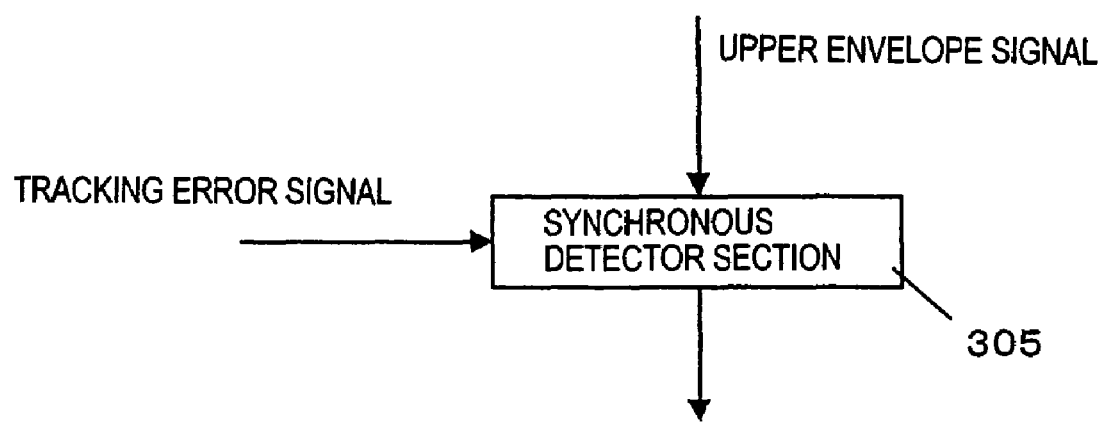
FIG. 10 shows another internal configuration for the amplitude detecting section 12 of the first preferred embodiment of the present invention.

As for the amplitude detecting method of the amplitude detecting section 12, a different method from the above-mentioned one may also be adopted. FIG. 10 shows another exemplary internal configuration for the amplitude detecting section 12. The synchronous detector section 305 shown in FIG. 10 performs synchronous detection on the upper envelope signal supplied from the peak envelope detector circuit 11 in response to the output tracking error signal of the tracking error detecting section 9, thereby outputting the resultant detected value as the amplitude of the upper envelope signal.

The frequency of the tracking error signal is equal to the frequency at which the light beam spot on the optical disc crosses the recording tracks on the optical disc. Accordingly, if the amplitude of some components of the upper envelope signal that have the same frequency as the tracking error signal is detected through the synchronous detection, then the variation due to the grooves can be extracted. As a result, the presence or absence of the grooves can be sensed even more strictly. It should be noted that the tracking error signal may be generated either by a push-pull method or by a phase difference method.

Optionally, as already described with reference to FIG. 8, the output of the synchronous detector section 305 may be further normalized by the amplitude normalizing section with the maximum quantity of light reflected as represented by the upper envelope signal. By doing that normalization, the presence or absence of the grooves can be sensed even more strictly.

EMBODIMENT 2

Figure 11:
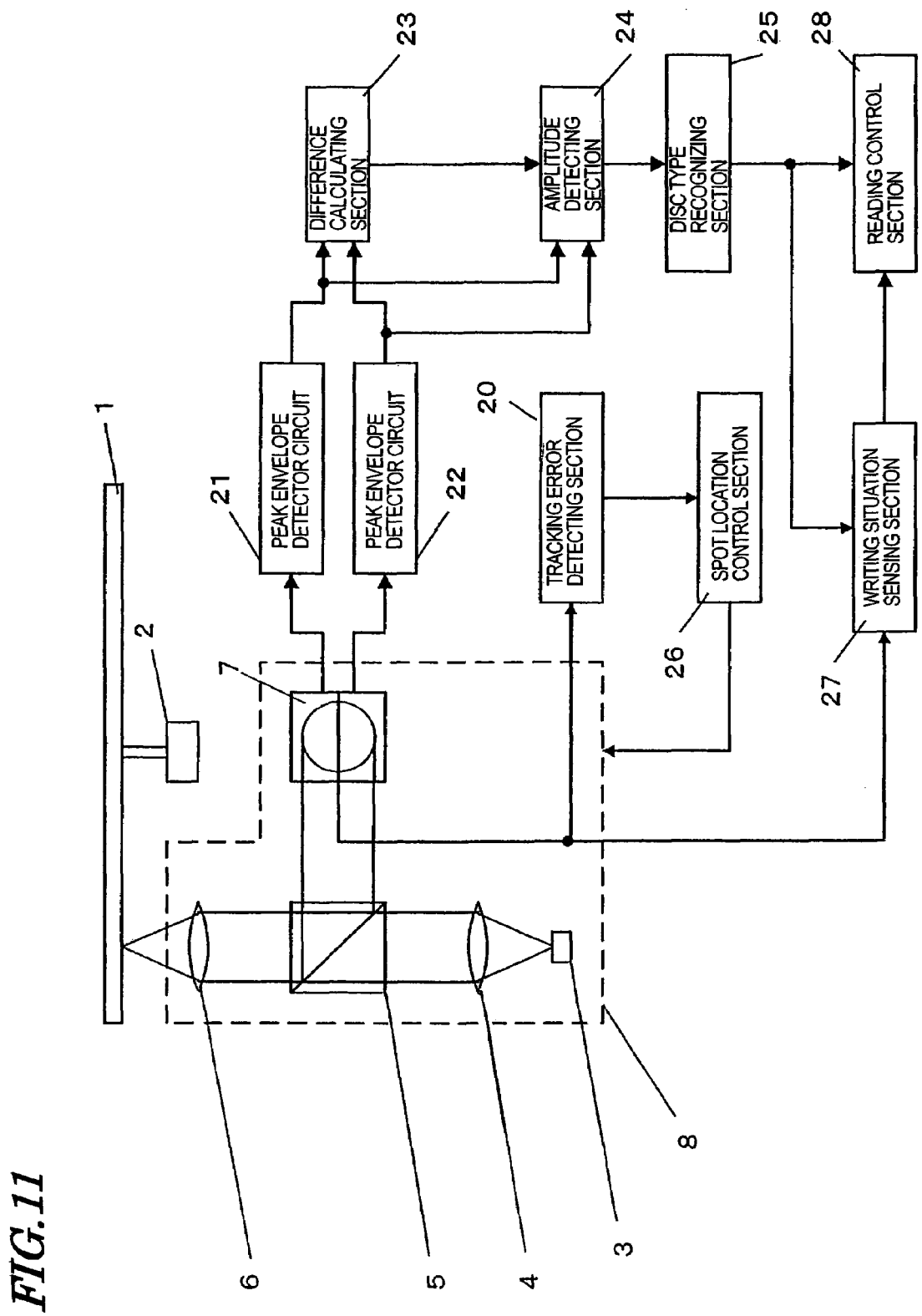
FIG. 11 shows a configuration according to a second preferred embodiment of the present invention.

Hereinafter, an optical disc drive according to a second preferred embodiment of the present invention will be described. FIG. 11 shows the main sections of the optical disc drive of this preferred embodiment. In FIG. 11, each component, which is equivalent to the counterpart shown in FIG. 7, is identified by the same reference numeral. As shown in FIG. 11, this optical disc drive has a configuration similar to the first preferred embodiment. However, this optical disc drive is different from the first preferred embodiment in that peak envelope detection is carried out on each of the outside and inside RF signals supplied from the photodetector 7 and that the difference between those peaks is calculated.

Hereinafter, the respective components of the optical disc drive of this preferred embodiment will be described in detail.

As in the first preferred embodiment described above, the tracking error detecting section 20 of this preferred embodiment detects a tracking error from the output signal of the photodetector 7, thereby generating a tracking error signal. Also, in accordance with the tracking error signal supplied from the tracking error detecting section 20, the spot location control section 26 generates a control signal and outputs it to the optical head 8, thereby controlling the location of the light beam spot.

The peak envelope detector circuit of this preferred embodiment includes two peak envelope detector circuits 21 and 22. The peak envelope detector circuits 21 and 22 detect the upper envelopes of the inside and outside RF signals supplied from the photodetector 7, thereby generating an inside upper envelope signal and an outside upper envelope signal, respectively. These upper envelope signals are output to a difference calculating section 23 and an amplitude detecting section 24.

The difference calculating section 23 calculates the difference between the inside and outside upper envelope signals supplied from the peak envelope detector circuits 21 and 22, thereby generating a differential signal, which is output to the amplitude detecting section 24.

The amplitude detecting section 24, also functioning as an amplitude normalizing section, detects the amplitude of the differential signal supplied from the difference calculating section 23, and then normalizes the amplitude with the average of two extreme values of the inside or outside upper envelope signal representing the higher quantity of light reflected. The normalized signal is output to a disc type recognizing section 25.

Based on the amplitude value supplied from the amplitude detecting section 24, the disc type recognizing section 25 determines whether the optical disc 1 loaded is a read-only disc or a recordable disc. If the loaded optical disc turns out to be a read-only disc, then the disc type recognizing section 25 outputs a digital signal representing "0" to the writing situation sensing section 27 and reading control section 28. On the other hand, if the loaded optical disc turns out to be a recordable disc, then the disc type recognizing section 25 outputs a digital signal representing "1" to the writing situation sensing section 27 and reading control section 28.

If the output digital signal of the disc type recognizing section 25 represents "1", then the writing situation sensing section 27 determines whether the information stored on the optical disc 1 was written there legally or illegally. If the information was written there legally, then the writing situation sensing section 27 outputs a digital signal representing "0" to the reading control section 28. On the other hand, if the information was written there illegally, then the writing situation sensing section 27 outputs a digital signal representing "1" to the reading control section 28. It should be noted that if the output digital signal of the disc type recognizing section 25 represents "0", then the writing situation sensing section 27 just passes a digital signal representing "0" to the reading control section 28 without checking the legality of the information.

The reading control section 28 performs an AND operation on the output digital signals of the disc type recognizing section 25 and disc type recognizing section 27. If the result of the AND operation is "0", then the reading control section 28 outputs a reading control signal, permitting reading the optical disc 1 loaded, to the read operation section (not shown) of this apparatus. On the other hand, if the result of the AND operation is "1", then the reading control section 28 outputs a reading control signal, prohibiting reading the optical disc 1 loaded, to the read operation section (not shown) of this apparatus.

Figure 12:
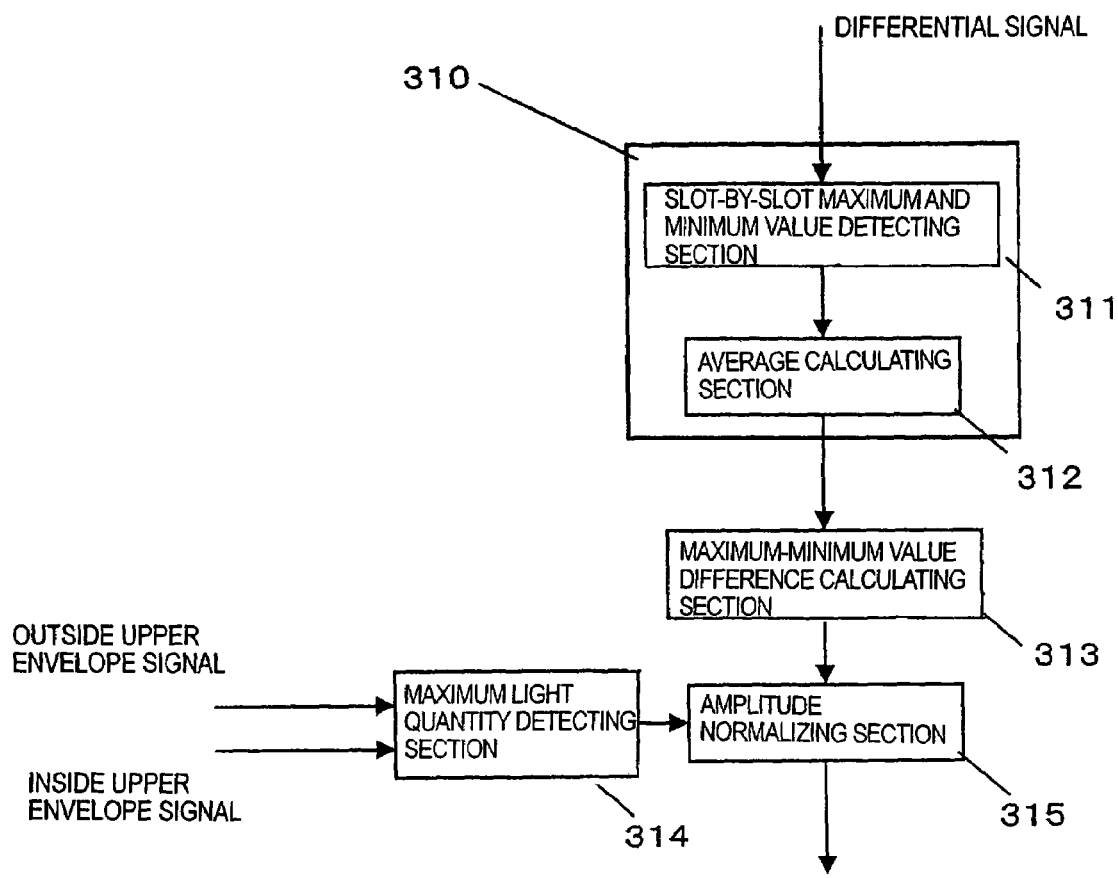
FIG. 12 shows an internal configuration for the amplitude detecting section 24 of the second preferred embodiment of the present invention.

Next, the details of the amplitude detecting section 24 will be described. FIG. 12 shows the internal configuration of the amplitude detecting section 24.

The maximum and minimum value detecting section 310 detects the maximum and minimum values of the differential signal supplied from the difference calculating section 23 during a first predetermined period of time. The first predetermined period of time is the time it takes for the light beam spot to cross a recording track or a groove multiple times.

The maximum and minimum value detecting section 310 includes a slot-by-slot maximum and minimum value detecting section 311 and an average calculating section 312. The slot-by-slot maximum and minimum value detecting section 311 detects the maximum and minimum values of the differential signal supplied from the difference calculating section 23 in each second period of time that is defined by dividing the first predetermined period of time into multiple time slots. The second predetermined period of time is the time it takes for the light beam spot to cross a recording track or groove at least once.

The average calculating section 312 calculates the average of multiple maximum values and the average of multiple minimum values that have been detected by the slot-by-slot maximum and minimum value detecting section 311, and outputs them as the maximum value and the minimum value of the differential signal during the first predetermined period of time. The average calculating section 312 calculates the average of the multiple maximum values with the largest and smallest ones removed, and calculates the average of the multiple minimum values with the largest and smallest ones also removed.

The maximum–minimum value difference calculating section 313 calculates the difference between the maximum and minimum values that have been detected by the maximum and minimum value detecting section 310 as the absolute value of the amplitude of the differential signal.

The maximum light quantity detecting section 314 detects the maximum quantities of light reflected as represented by the inside and outside upper envelope signals that are supplied from the peak envelope detector circuits 21 and 22, calculates the average of these maximum values, and outputs it to the amplitude normalizing section 315.

The amplitude normalizing section 315 normalizes the absolute value of the amplitude, supplied from the maximum–minimum value difference calculating section 303, with the output value of the maximum light quantity detecting section 314, thereby outputting a normalized amplitude value of the differential signal.

The amplitude detecting section 24 of this preferred embodiment, having such a configuration, can detect the alternating current amplitude of the differential signal output from the difference calculating section 23.

Next, the details of the writing situation sensing section 27 will be described in detail.

If the disc type recognizing section 25 has recognized the loaded optical disc as a recordable disc, the writing situation sensing section 27 determines whether information stored on the recordable disc was written there legally or illegally. As already described for the first preferred embodiment, such a decision can be made by using auxiliary information as described in Japanese Laid-Open Publication No. 2001-357533, for example. Based on the output signal of the photodetector 7, the writing situation sensing section 27 determines whether there is the auxiliary information or not. If there is the auxiliary information, then the writing situation sensing section 27 regards the information as having been written there legally. Otherwise, the writing situation sensing section 27 regards the information as having been written there illegally.

Hereinafter, the flow of the disc type recognition according to this preferred embodiment will be described.

First, the optical disc 1 is rotated by the motor 2. With a light beam spot formed on the recording side of the rotating optical disc 1, the spot location control section 26 controls the position of the optical head such that the light beam spot crosses the recording tracks on the optical disc 1. In this case, the outside and inside RF signals output from the photodetector 7 have the waveforms shown in FIGS. 5 and 6.

Figure 13:
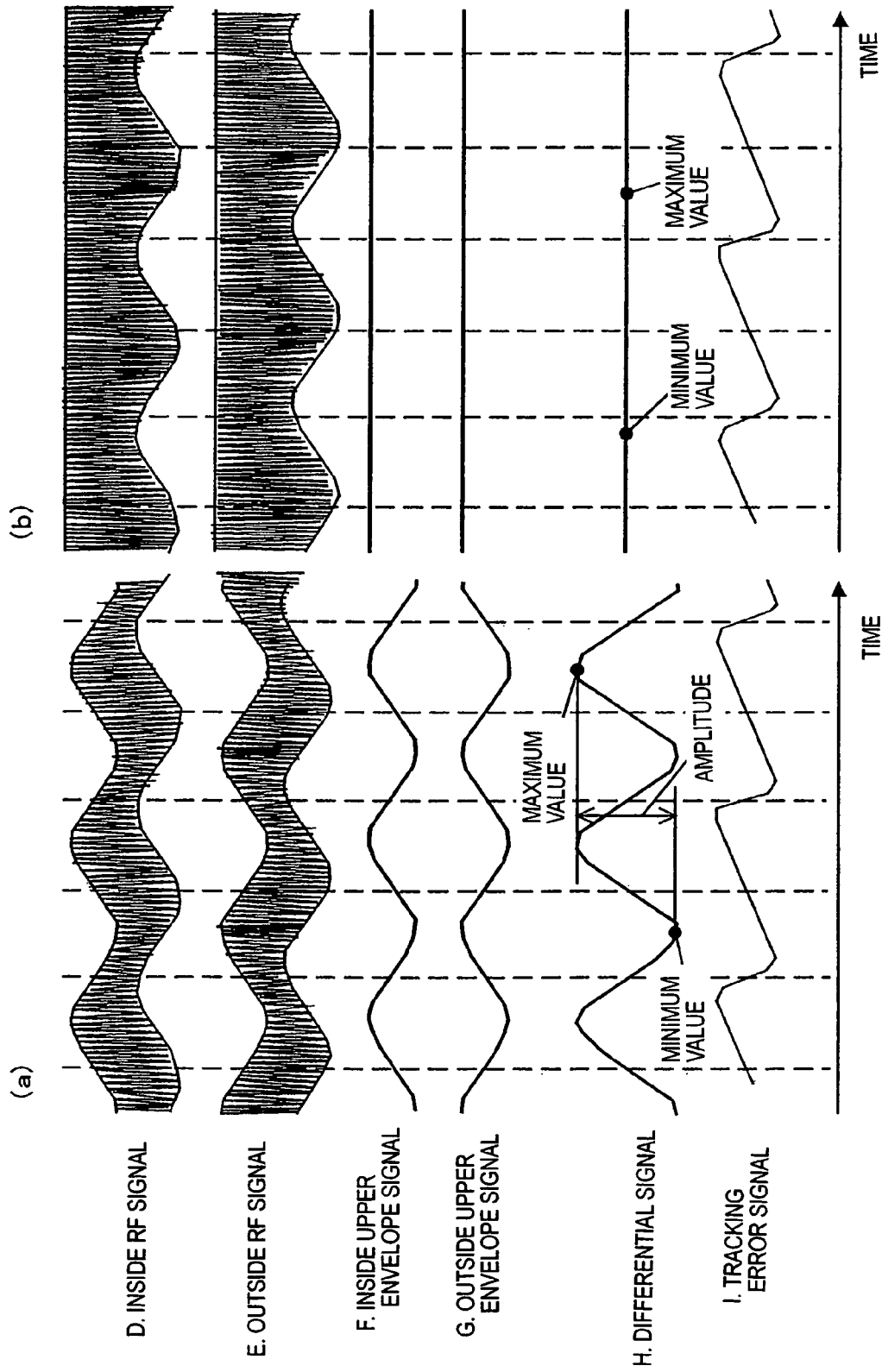
FIG. 13(a) shows exemplary signal waveforms to be obtained when the optical disc drive is loaded with a recordable disc with grooves of the first preferred embodiment of the present invention.
FIG. 13(b) shows exemplary signal waveforms to be obtained when the optical disc drive is loaded with a read-only disc with no grooves of the first preferred embodiment.

The remaining operations will be described with reference to FIG. 13. FIG. 13 shows exemplary waveforms of the input and output signals of the respective components according to the preferred embodiment shown in FIG. 11. FIG. 13(a) shows exemplary signal waveforms to be obtained when the optical disc drive is loaded with a recordable disc with grooves, and FIG. 13(b) shows exemplary signal waveforms to be obtained when the optical disc drive is loaded with a read-only disc with no grooves.

The inside and outside RF signals D and E shown in FIGS. 13(a) and 13(b) are the output signals of the photodetector 7. The inside upper envelope signal F is a signal obtained by getting peak envelope detection done on the inside RF signal D by the peak envelope detector circuit 21. The outside upper envelope signal G is a signal obtained by getting peak envelope detection done on the outside RF signal E by the peak envelope detector circuit 22. The differential signal H is a signal obtained by getting the difference between the inside and outside upper envelope signals F and G calculated by the difference calculating section 23. The tracking error signal I is the output signal of the tracking error detecting section 20. The frequency of the tracking error signal I is equal to the frequency at which the light beam spot crosses the recording tracks on the optical disc 1.

If the optical disc drive is loaded with a recordable disc, the inside and outside upper envelope signals F and G oscillate at the same frequency as the tracking error signal I as shown in FIG. 13(a). Also, these upper envelope signals F and G have mutually inverted waveforms. Accordingly, the differential signal H, representing the difference between the inside and outside upper envelope signals F and G, oscillates at the same frequency as the tracking error signal I. For that reason, if the amplitude of the differential signal H is determined by the amplitude detecting section 24 over several periods of the tracking error signal I, then the absolute value of the amplitude becomes at least equal to a certain value. Furthermore, if the amplitude is normalized with the average of the maximum values of the inside and outside upper envelope signals by the amplitude normalizing section 315, then the resultant normalized amplitude value also becomes at least equal to a certain value.

On the other hand, if the optical disc drive is loaded with a read-only disc, the upper envelopes of the outside and inside RF signals E and D hardly vary as shown in FIG. 13(b). Accordingly, the differential signal H becomes a signal that hardly varies, either. Consequently, the normalized amplitude value of the differential signal H, detected by the amplitude detecting section 24 over several periods of the tracking error signal I, is approximately equal to zero.

In this manner, if the value obtained by the amplitude detecting section 24 is equal to or greater than a predetermined value, then the disc type recognizing section 25 of this preferred embodiment recognizes the loaded disc as a recordable disc. On the other hand, if that value is less than the predetermined value, then the disc type recognizing section 25 recognizes the loaded disc as a read-only disc.

Optionally, the photodetector 7 may also be designed so as to separately detect the quantities of light reflected from not only the two divisions defined in the tangential direction of the recording tracks or grooves but also two more divisions defined perpendicularly to the tangential direction for a light beam spot. Also, the photodetector may detect a signal proportional to the quantity of light reflected from an inside portion and a signal proportional to the quantity of light reflected from an outside portion such that these signals represent quantities of light reflected from two locations that are symmetric to each other with respect to the tangential direction of the recording tracks, and use them as the inside and outside RF signals, respectively.

The following is the flow of processes to be carried out after the disc type has been recognized.

If the disc type recognizing section 25 has recognized the loaded optical disc as a recordable disc, then the writing situation sensing section 27 determines whether the information stored on the optical disc was written there legally or illegally, thereby outputting a digital signal representing the decision result. On the other hand, if the disc type recognizing section 25 has recognized the loaded optical disc as a read-only disc, then the writing situation sensing section 27 outputs a digital signal with a value of zero.

The reading control section 28 performs an AND operation on the two output digital signals of the disc type recognizing section 25 and writing situation sensing section 27. In this case, if the loaded optical disc is either a read-only disc or a recordable disc on which information was written legally, then the result of the operation is "0", thus permitting reading the given optical disc. On the other hand, if the loaded optical disc is a recordable disc on which information was written illegally, then the result of the operation is "1", thus prohibiting reading the optical disc. The read operation section of the optical disc drive according to this preferred embodiment selectively performs its read operation in accordance with such an instruction to permit or prohibit reading the given optical disc.

The amplitude of the differential signal H for use in this preferred embodiment is approximately twice as large as that of the upper envelope signal obtained in the first preferred embodiment. Also, the common-mode noise is removed by the difference calculating section. Accordingly, the type of the given disc can be recognized with higher reliability. As a result, a read-only disc and a recordable disc with legally written information are accepted but a recordable disc with illegally written information is rejected, thus strongly discouraging circulation of illegal discs.

The legality of information written on a recordable disc does not have to be judged by using the auxiliary information as described for the first preferred embodiment but may also be checked by any other method.

Optionally, the writing situation sensing section 27 for determining whether the information on a recordable disc was written there legally or illegally may be omitted and the reading control section 28 may permit or prohibit reading the loaded optical disc based on only the result of type recognition performed by the disc type recognizing section 25. In that case, if the output digital signal of the disc type recognizing section 25 is "0", then the reading control section 28 outputs a reading control signal, permitting reading the loaded optical disc 1, to the read operation section (not shown) of this optical disc drive. On the other hand, if the output digital signal of the disc type recognizing section 25 is "1", then the reading control section 28 outputs a reading control signal, prohibiting reading the loaded optical disc 1, to the read operation section (not shown) of this optical disc drive. Such an optical disc drive accepts only read-only discs and rejects all recordable discs. Accordingly, potentially illegally copied optical discs are eliminated from the beginning, thus strongly discouraging the circulation of illegal discs.

As already described for the first preferred embodiment, the first and second predetermined periods of time may be calculated in advance with the rate at which the light beam spot crosses the recording tracks expected. Alternatively, those periods of time may be set equal to predetermined numbers of periods of the output tracking error signal of the tracking error detecting section 20 by monitoring the tracking error signal at regular intervals. The same effects as those already described for the first preferred embodiment are also achieved.

The spot location control section 26 can also control the location of the light beam spot as in the first preferred embodiment, and there are also two methods for making the light beam spot cross the recording tracks as described above.

In detecting the alternating current amplitude of the differential signal, the amplitude normalizing section 315 normalizes the amplitude with the average of the maximum values of the inside and outside upper envelope signals, i.e., the average of the maximum quantities of light reflected as represented by the outside and inside RF signals. The maximum quantity of light reflected is substantially determined only by the reflectance that changes with the shape of the light beam spot, the light quantity distribution and the type of the optical disc. Accordingly, if the amplitude is normalized with the maximum quantity of light reflected, then the amplitude of the upper envelope signal is not affected by these factors anymore. As a result, the difference in amplitude due to the presence or absence of grooves can be detected even more clearly.

In this preferred embodiment, the maximum and minimum value detecting section 310 detects the maximum and minimum values in a first predetermined period of time. Specifically, the slot-by-slot maximum and minimum value detecting section 311 divides the first predetermined period of time into multiple time slots and detects the maximum values and minimum values multiple times. Then, the average calculating section 312 calculates the average of the multiple maximum values and that of the multiple minimum values. By adopting such a detecting technique, even if some outstanding variation has been sensed in the differential signal due to not the presence or absence of grooves but noise, defects on the recording side of the optical disc or LPPs on a DVD-R or DVD-RW disc, the unwanted effects thereof can be reduced significantly and the erroneous amplitude detection can be prevented.

The average of the multiple maximum values is preferably calculated with the largest and smallest ones removed and the average of the multiple minimum values is preferably calculated with the largest and smallest ones removed, too. Then, the unwanted effects of the noise, defects on the recording side and LPPs can be further reduced. Optionally, the average of the multiple maximum or minimum values may also be calculated with not only the largest and smallest ones but also second largest and smallest ones removed. In that case, the unwanted effects of the noise, defects on the recording side and LPPs can be further reduced.

In the preferred embodiment described above, to detect the amplitude with more reliability, the averaging process is carried out by the slot-by-slot maximum and minimum value detecting section 311 and average calculating section 312 and the normalizing process is also carried out by the amplitude normalizing section 315. However, the amplitude of the differential signal can also be detected even if these processes are omitted. The maximum and minimum values can also be detected by just comparing sampled values with each other sequentially. Then, the maximum and minimum values can be detected with a simplified circuit configuration or a simplified program. Accordingly, if the averaging and normalizing processes are omitted, the amplitude can be detected in a short time with a simpler configuration adopted.

Figure 14:
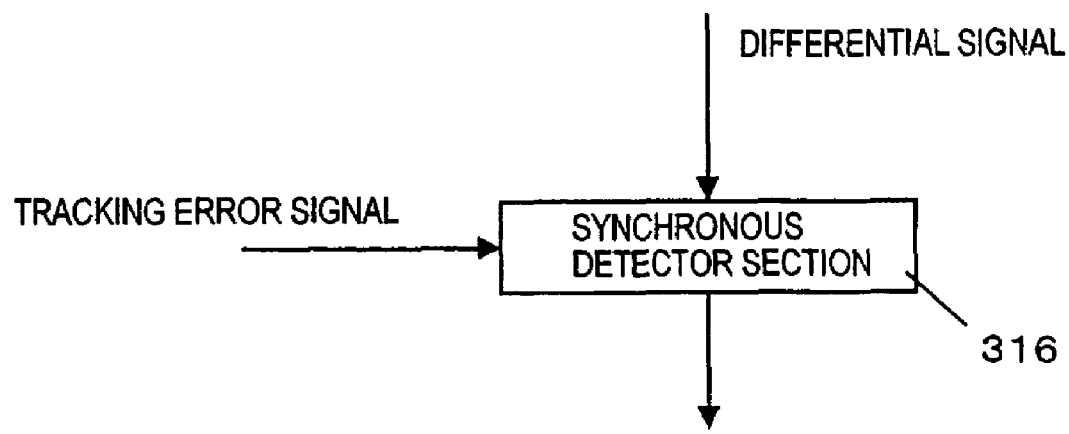
FIG. 14 shows another internal configuration for the amplitude detecting section 24 of the second preferred embodiment of the present invention.

As for the amplitude detecting method of the amplitude detecting section 24, a different method from the above-mentioned one may also be adopted. FIG. 14 shows another exemplary internal configuration for the amplitude detecting section 24. The synchronous detector section 316 shown in FIG. 14 performs synchronous detection on the differential signal supplied from the difference calculating section 23 in response to the output tracking error signal of the tracking error detecting section 20, thereby outputting the resultant detected value as the amplitude of the differential signal.

By using such a configuration, the amplitude of some components of the differential signal that have the same frequency as the tracking error signal is detected through the synchronous detection. Thus, the variation due to the grooves can be extracted and the presence or absence of the grooves can be sensed even more strictly. It should be noted that the tracking error signal may be generated either by a push-pull method or by a phase difference method.

Optionally, as already described with reference to FIG. 12, the output of the synchronous detector section 316 may be further normalized by the amplitude normalizing section with the average of the maximum quantities of light reflected as represented by the inside and outside upper envelope signals. By doing that normalization, the presence or absence of the grooves can be sensed even more strictly.

Next, a peak envelope detector circuit for use in the first and second preferred embodiments will be described with reference to FIG. 15.

Figure 15:
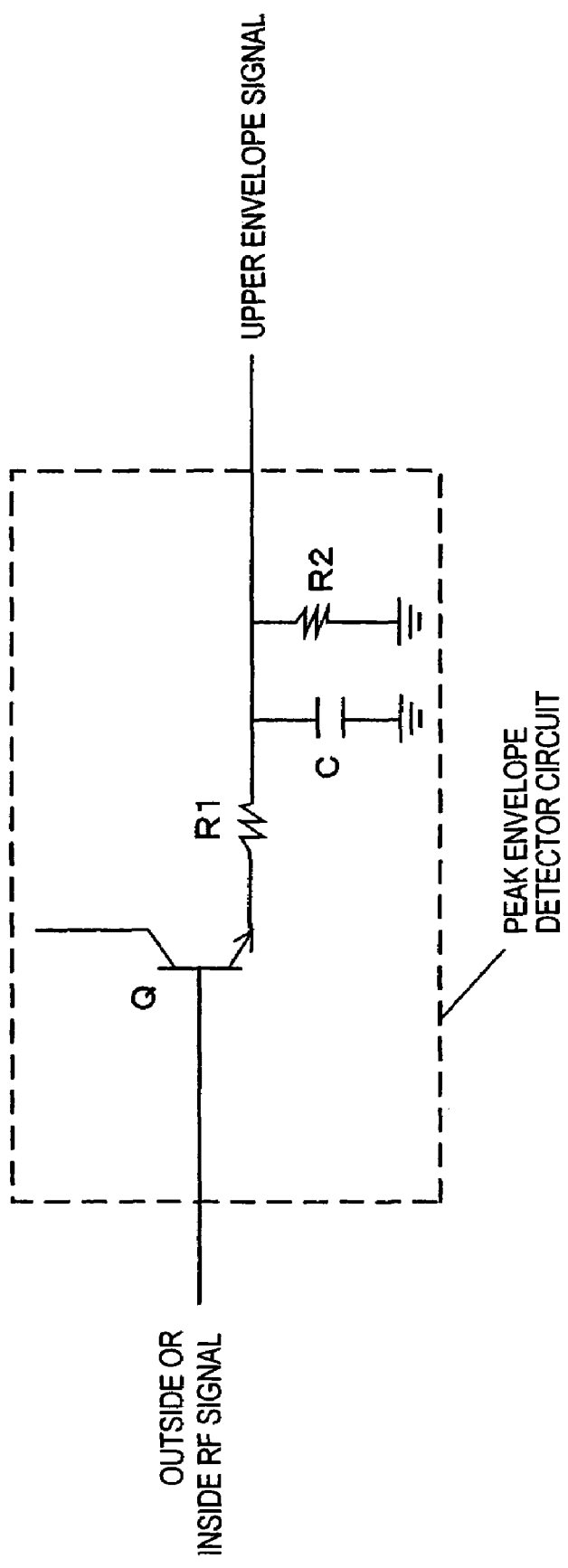
FIG. 15 shows a circuit configuration for a peak envelope detector circuit according to the second preferred embodiment of the present invention.

FIG. 15 shows a circuit configuration for the peak envelope detector circuit. In FIG. 15, Q denotes a transistor, C denotes a capacitor, and R1 and R2 denote resistors.

The peak envelope detector circuit detects the maximum value of its input signal, thereby outputting an upper envelope signal. The resistor R1 is inserted so as to give a time constant to the response speed to the maximum value and thereby decrease the response speed. The inside and outside RF signals supplied from the photodetector may change so steeply as to have an outstanding value. This phenomenon happens due to the effects of noise superposed on a signal, defects on the recording side of the optical disc, and LPPs on a DVD-R or DVD-RW disc. If no resistor R1 were inserted into the circuit, then the upper envelope signal would respond to such a variation, the amplitude detected by the amplitude detecting section would become greater than the value to be detected actually, and the presence or absence of grooves might be sensed erroneously.

In this preferred embodiment, to prevent the upper envelope signal from responding to such a steep variation of the inside and outside RF signals, a low pass filter is made up of the resistor R1 and the capacitor C. This low pass filter can remove high frequency components from the inside and outside RF signals. If the cutoff frequency of the low pass filter is defined so as to minimize the effects of such a steep variation, then the unexpected response of the upper envelope signal can be minimized. As a result, the erroneous amplitude detection can be avoided and the presence or absence of grooves can be sensed with high reliability.

INDUSTRIAL APPLICABILITY

The present invention provides an optical disc drive that can recognize the type of a given optical disc accurately by properly sensing the difference in surface shape between multiple types of optical discs without being affected by any difference in the shape of light beam spot or light quantity distribution. Also, according to a preferred embodiment of the present invention, the given optical disc can be accurately recognized as either a read-only disc or a recordable disc, thereby judging whether the information stored on the recordable disc infringes copyright or not. If the information stored turns out to be an infringement of copyright, then the optical disc including such information is rejected. Thus, the circulation of illegally copied optical discs that should constitute copyright infringement can be strongly discouraged.

The invention claimed is:

1. An optical disc drive loadable with an arbitrarily selected one of optical discs of multiple types including a first optical disc with grooves and a second optical disc with no grooves, the optical disc drive comprising:
   an optical system for irradiating the recording side of the loaded optical disc with a laser beam;
   a light detecting section, which receives reflected light from the optical disc to generate a first output signal representing the quantity of at least a part of the light reflected from an inside portion of the optical disc and a second output signal representing the quantity of at least a part of the light reflected from an outside portion of the optical disc;
   a spot location control section for shifting the spot location of the laser beam on the optical disc across recording tracks on the optical disc; and
   a disc type recognizing section for determining, by an upper envelope signal of at least one of the first and second output signals, whether the loaded optical disc has grooves or not.

2. The optical disc drive of claim 1, wherein the first optical disc is a recordable optical disc including a storage layer and wherein the second optical disc is a read-only optical disc including a plurality of pits that are arranged along the recording tracks.

3. The optical disc drive of claim 1, wherein the light detecting section receives the light that has been reflected from the optical disc, divides the reflected light into multiple parts such that the laser beam spot on the optical disc is divided into at least two in a tangential direction of the recording tracks, and outputs the signals representing the light quantities of the respective divided parts.

4. The optical disc drive of claim 1, wherein the disc type recognizing section includes:
   a peak envelope detector circuit, which receives the first or second output signal and carries out peak envelope detection on high-intensity components of the received signal, thereby detecting the maximum quantity of light received and generating the upper envelope signal; and
   an amplitude detecting section for detecting an alternating current amplitude of the upper envelope signal.

5. The optical disc drive of claim 1, wherein the disc type recognizing section includes:
   a peak envelope detector circuit, which receives the first and second output signals and carries out peak envelope detection on high-intensity components of each of the output signals received, thereby detecting the maximum quantity of light received and generating the upper envelope signals of the first and second output signals;
   a difference calculating section for calculating a difference between the upper envelope signals of the first and second output signals; and
   an amplitude detecting section for detecting an alternating current amplitude of the output signal of the difference calculating section.

6. The optical disc drive of claim 4, further comprising an amplitude normalizing section for normalizing the output signal of the amplitude detecting section with a selected one of the extreme values of the output signal of the peak envelope detector circuit, the extreme value selected being associated with the higher quantity of light reflected.

7. The optical disc drive of claim 4, wherein the peak envelope detector circuit receives the first output signal, representing the total quantity of the light reflected from the inside portion of the optical disc, and/or the second output signal, representing the total quantity of the light reflected from the outside portion of the optical disc, and carries out peak envelope detection on one of the first and second output signals that is associated with the higher quantity of light reflected.

8. The optical disc drive of claim 4, further comprising a tracking error detecting section for outputting a tracking error signal, representing how much the spot location of the laser beam is shifted from the center of the recording tracks, in accordance with the output signal of the light detecting section,
 wherein the amplitude detecting section includes a synchronous detector section for detecting the amplitude of components of the output signal of the peak envelope detector circuit, which are synchronous with the output signal of the tracking error detecting section, and provides the output of the synchronous detector section as the alternating current amplitude.

9. The optical disc drive of claim 4, wherein the amplitude detecting section includes:
 a maximum and minimum value detecting section for detecting the maximum and minimum values of the output signal of the peak envelope detector circuit during a first predetermined period of time; and
 a maximum–minimum value difference calculating section for calculating a difference between the maximum and minimum values that have been detected by the maximum and minimum value detecting section, and
 wherein the amplitude detecting section provides the output of the maximum–minimum value difference calculating section as the alternating current amplitude.

10. The optical disc drive of claim 9, wherein the maximum and minimum value detecting section includes:
 a slot-by-slot maximum and minimum value detecting section for detecting the maximum and minimum values of the output signal of the peak envelope detector circuit in each second period of time that is defined by dividing the first predetermined period of time into multiple time slots; and
 an average calculating section for calculating an average of multiple maximum values and an average of multiple minimum values that have been detected by the slot-by-slot maximum and minimum value detecting section, and
 wherein the average of the maximum values and the average of the minimum values output from the average calculating section are used as the maximum value and the minimum value of the output signal of the peak envelope detector circuit during the first predetermined period of time.

11. The optical disc drive of claim 10, wherein the average calculating section calculates the average of the maximum values with either the largest and smallest ones, or second largest and second smallest ones, removed from the maximum values detected by the slot-by-slot maximum and minimum value detecting section, and calculates the average of the minimum values with either the largest and smallest ones, or second largest and second smallest ones, removed from the minimum values detected by the slot-by-slot maximum and minimum value detecting section.

12. The optical disc drive of claim 10 or 11, further comprising a crossing time detecting section for detecting, based on the output signal of the light detecting section, a point in time when the beam spot of the laser beam on the optical disc has crossed the recording tracks a predetermined number of times since a certain point in time,
 wherein the maximum and minimum value detecting section regards the first and second predetermined periods of time as being output by the crossing time detecting section.

13. The optical disc drive of claim 1, wherein the peak envelope detector circuit includes a circuit component for rounding the waveform of at least one of the first and second output signals that have been supplied from the light detecting section.

14. The optical disc drive of claim 1, wherein the spot location control section fixes the beam spot of the laser beam on the optical disc at a certain radial location on the optical disc and offsets the spot location of the laser beam from the center of the recording tracks by utilizing eccentricity of the optical disc rotating.

15. The optical disc drive of claim 1, wherein the spot location control section shifts the beam spot of the laser beam on the optical disc in a radial direction of the optical disc, thereby offsetting the spot location of the laser beam from the center of the recording tracks.

16. The optical disc drive of claim 2, further comprising a reading control section for either permitting or prohibiting reading the optical disc in accordance with the output of the disc type recognizing section,
 wherein if the disc type recognizing section has recognized the loaded optical disc as a read-only optical disc, the reading control section permits reading the optical disc, but
 if the disc type recognizing section has recognized the loaded optical disc as a recordable optical disc, the reading control section prohibits reading the optical disc.

17. The optical disc drive of claim 2, further comprising a writing situation sensing section for determining, if the disc type recognizing section has recognized the loaded optical disc as a recordable optical disc, whether information stored on the recordable optical disc was written there legally or illegally.

18. The optical disc drive of claim 17, further comprising a reading control section for either permitting or prohibiting reading the optical disc in accordance with the output of the disc type recognizing section and the output of the writing situation sensing section,
 wherein if the disc type recognizing section has recognized the loaded optical disc as a read-only optical disc or if the disc type recognizing section has recognized the loaded optical disc as a recordable optical disc and the writing situation sensing section has discovered that the information was written on the recordable disc legally, the reading control section permits reading the optical disc, but
 if the disc type recognizing section has recognized the loaded optical disc as a recordable optical disc and the writing situation sensing section has discovered that the information was written on the recordable disc illegally, the reading control section prohibits reading the optical disc.

19. An optical disc drive loadable with an arbitrarily selected one of optical discs of multiple types having recording sides in mutually different surface shapes, the optical disc drive comprising:
  an optical system for irradiating the recording side of the loaded optical disc with a laser beam;
  a light detecting section, which receives reflected light from the optical disc to generate a first output signal representing the quantity of at least a part of the light reflected from an inside portion of the optical disc and a second output signal representing the quantity of at least a part of the light reflected from an outside portion of the optical disc;
  a spot location control section for shifting the spot location of the laser beam on the optical disc; and
  a disc type recognizing section for recognizing the type of the loaded optical disc by an upper envelope signal of at least one of the first and second output signals.

20. A method for driving an optical disc drive, which is loadable with an arbitrarily selected one of optical discs of multiple types including a recordable disc with grooves and a read-only disc with no grooves, the method comprising the steps of:
  irradiating the recording side of the loaded optical disc with a laser beam;
  receiving light reflected from the optical disc to generate a first output signal representing the quantity of at least a part of the light reflected from an inside portion of the optical disc and a second output signal representing the quantity of at least a part of the light reflected from an outside portion of the optical disc;
  shifting the spot location of the laser beam on the optical disc across recording tracks on the optical disc; and
  determining, by an upper envelope signal of at least one of the first and second output signals, whether the loaded optical disc has grooves or not.

21. The method of claim 20, further comprising the steps of:
  permitting reading the loaded optical disc if the loaded optical disc has turned out to be the read-only disc; and
  prohibiting reading the loaded optical disc if the loaded optical disc has turned out to be the recordable disc.

22. The method of claim 21, wherein if the loaded optical disc has turned out to be the recordable optical disc, the method further comprises the step of determining whether information stored on the recordable optical disc was written there legally or illegally and rejecting the optical disc if the information was written there illegally.

* * * * *

UNITED STATES PATENT AND TRADEMARK OFFICE
CERTIFICATE OF CORRECTION

| | |
|---|---|
| PATENT NO. | : 7,046,606 B2 |
| APPLICATION NO. | : 10/489909 |
| DATED | : May 16, 2006 |
| INVENTOR(S) | : Rie Takahashi et al. |

It is certified that error appears in the above-identified patent and that said Letters Patent is hereby corrected as shown below:

Column 26::

Line 3, delete "or 11".

Signed and Sealed this

Twenty-first Day of November, 2006

JON W. DUDAS
*Director of the United States Patent and Trademark Office*